(12) United States Patent
Jung et al.

(10) Patent No.: US 11,238,622 B2
(45) Date of Patent: Feb. 1, 2022

(54) METHOD OF PROVIDING AUGMENTED REALITY CONTENTS AND ELECTRONIC DEVICE THEREFOR

(71) Applicant: SAMSUNG ELECTRONICS CO., LTD., Suwon-si (KR)

(72) Inventors: Hansub Jung, Suwon-si (KR); Sunho Moon, Suwon-si (KR); Seongki Ryu, Suwon-si (KR); Donghyun Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/794,621

(22) Filed: Feb. 19, 2020

(65) Prior Publication Data

US 2020/0265614 A1 Aug. 20, 2020

(30) Foreign Application Priority Data

Feb. 19, 2019 (KR) .......................... 10-2019-0019570

(51) Int. Cl.
*G06T 11/00* (2006.01)
*G06T 7/70* (2017.01)

(52) U.S. Cl.
CPC ................ *G06T 11/00* (2013.01); *G06T 7/70* (2017.01); *G06T 2200/24* (2013.01); *G06T 2207/30204* (2013.01)

(58) Field of Classification Search
None
See application file for complete search history.

(56) References Cited

U.S. PATENT DOCUMENTS

| | | | |
|---|---|---|---|
| 9,659,385 B2 | 5/2017 | Jung et al. | |
| 9,721,394 B2 | 8/2017 | Rosenthal et al. | |
| 9,792,733 B2 | 10/2017 | Rosenthal et al. | |
| 2012/0057032 A1 | 3/2012 | Jang et al. | |
| 2015/0206349 A1 | 7/2015 | Rosenthal et al. | |
| 2016/0027180 A1 | 1/2016 | Iyer et al. | |
| 2016/0240010 A1 | 8/2016 | Rosenthal et al. | |
| 2016/0267553 A1* | 9/2016 | Slagel ................ | G06Q 30/0269 |
| 2016/0292926 A1 | 10/2016 | Rosenthal et al. | |
| 2017/0127128 A1* | 5/2017 | Seger ................. | G06F 16/2282 |

(Continued)

FOREIGN PATENT DOCUMENTS

| | | |
|---|---|---|
| KR | 10-0789100 | 12/2007 |
| KR | 10-2012-0009949 | 2/2012 |
| WO | 2019/017582 | 1/2019 |

OTHER PUBLICATIONS

Overly app, "Create your own augmented reality", published Aug. 27, 2018, retrieved Mar. 27, 2021 from https://www.youtube.com/watch?v=cQCrMh8oZ3c.*

(Continued)

*Primary Examiner* — Zhengxi Liu
(74) *Attorney, Agent, or Firm* — Nixon & Vanderhye P.C.

(57) ABSTRACT

An electronic device may identify a marker in an image based on an input to the image displayed on the display, identify at least one object associated with the marker using marker information of the identified marker, display the identified at least one object on the display as recommendation contents associated with the marker, and map at least part of the at least one object to the marker based on an input to generate augmented reality contents.

13 Claims, 16 Drawing Sheets

(56) References Cited

U.S. PATENT DOCUMENTS

| | | |
|---|---|---|
| 2017/0200314 A1 | 7/2017 | Jeong |
| 2017/0256075 A1 | 9/2017 | Jung et al. |
| 2017/0330361 A1* | 11/2017 | Fisher ..................... G06F 16/00 |
| 2017/0372525 A1 | 12/2017 | Rosenthal et al. |
| 2018/0004760 A1* | 1/2018 | Bataller ................. G06N 20/00 |

OTHER PUBLICATIONS

International Search Report and Written Opinion dated Jun. 10, 2020 in counterpart International Patent Application No. PCT/KR2020/002340.

\* cited by examiner

METHOD OF PROVIDING AUGMENTED REALITY CONTENTS AND ELECTRONIC DEVICE THEREFOR

CROSS-REFERENCE TO RELATED APPLICATION

This application is based on and claims priority under 35 U.S.C. § 119 to Korean Patent Application No. 10-2019-0019570, filed on Feb. 19, 2019, in the Korean Intellectual Property Office, the disclosure of which is incorporated by reference herein its entirety.

BACKGROUND

1. Field

The disclosure relates to a method of providing augmented reality contents and an electronic device therefor.

2. Description of Related Art

Electronic devices including displays have been widely distributed. An electronic device may display the execution screen of an application on a display in response to the execution of the application. Furthermore, the electronic device may include a camera for obtaining an image. For example, the electronic device may obtain an image, using the camera in response to the execution of the application and may display the obtained image on the display in real time as at least part of the execution screen.

As the performance of a portable electronic device is improved, augmented reality contents using the portable device may be provided. For example, the electronic device may provide the augmented reality contents in real time by adding an augmented reality object to the image obtained using the camera.

An electronic device may provide augmented reality contents using a specified marker. For example, the electronic device may identify a marker from the obtained image and may add an augmented reality object corresponding to the identified marker to the obtained image. The marker may be an image set by the creator of the augmented reality contents. The user of the electronic device utilizes the electronic device in various environments, but the augmented reality contents may be limited by the marker setting of the creator of the augmented reality contents.

When the user directly generates the augmented reality contents, the user may select a marker and an augmented reality object corresponding to the marker. In this case, the user may find the augmented reality object matched with the marker. Accordingly, the user may spend time and effort to map the marker to the augmented reality object. Moreover, the user may desire to share his/her augmented reality contents with other people.

The above information is presented as background information only to assist with an understanding of the disclosure. No determination has been made, and no assertion is made, as to whether any of the above might be applicable as prior art with regard to the disclosure.

SUMMARY

Embodiments of the disclosure address at least the above-mentioned problems and/or disadvantages and provide at least the advantages described below.

In accordance with an example aspect of the disclosure, an electronic device may include a camera, a display, a communication circuit, a processor operatively connected to the camera, the display, and the communication circuit, and a memory operatively connected to the processor. The memory may store one or more instructions that, when executed, cause the processor to control the electronic device to: identify a marker in an image based on an input to the image displayed on the display, identify at least one object associated with the marker using marker information of the identified marker, display the identified at least one object on the display as recommendation contents associated with the marker, and map the marker to at least part of the at least one object based on an input to generate augmented reality contents.

In accordance with another example aspect of the disclosure, an electronic device may include a camera, a display, a communication circuit, a processor operatively connected to the camera, the display, and the communication circuit, and a memory operatively connected to the processor. The memory may store one or more instructions that, when executed, cause the processor to control the electronic device to: receive an augmented reality contents file from an external electronic device using the communication circuit, obtain a preview image using the camera, and overlay the preview image and at least one object of the augmented reality contents file corresponding to the identified marker to display the overlaid result on the display based on a marker included in the augmented reality contents file being identified from the preview image.

In accordance with another example aspect of the disclosure, an augmented reality contents generating method of an electronic device may include: identifying a marker in an image based on an input to the image displayed on a display of the electronic device, identifying at least one object associated with the marker using marker information of the identified marker, displaying the identified at least one object on the display as recommendation contents associated with the marker, and mapping the marker to at least part of the at least one object based on an input to generate augmented reality contents.

Other aspects, advantages, and salient features of the disclosure will become apparent to those skilled in the art from the following detailed description, which, taken in conjunction with the annexed drawings, discloses various example embodiments of the disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various example embodiments of the disclosure will be described in greater detail with reference to accompanying drawings. However, those of ordinary skill in the art will recognize that various modifications, equivalents, and/or alternatives on various example embodiments described herein can be variously made without departing from the scope and spirit of the disclosure.

Figure 1:
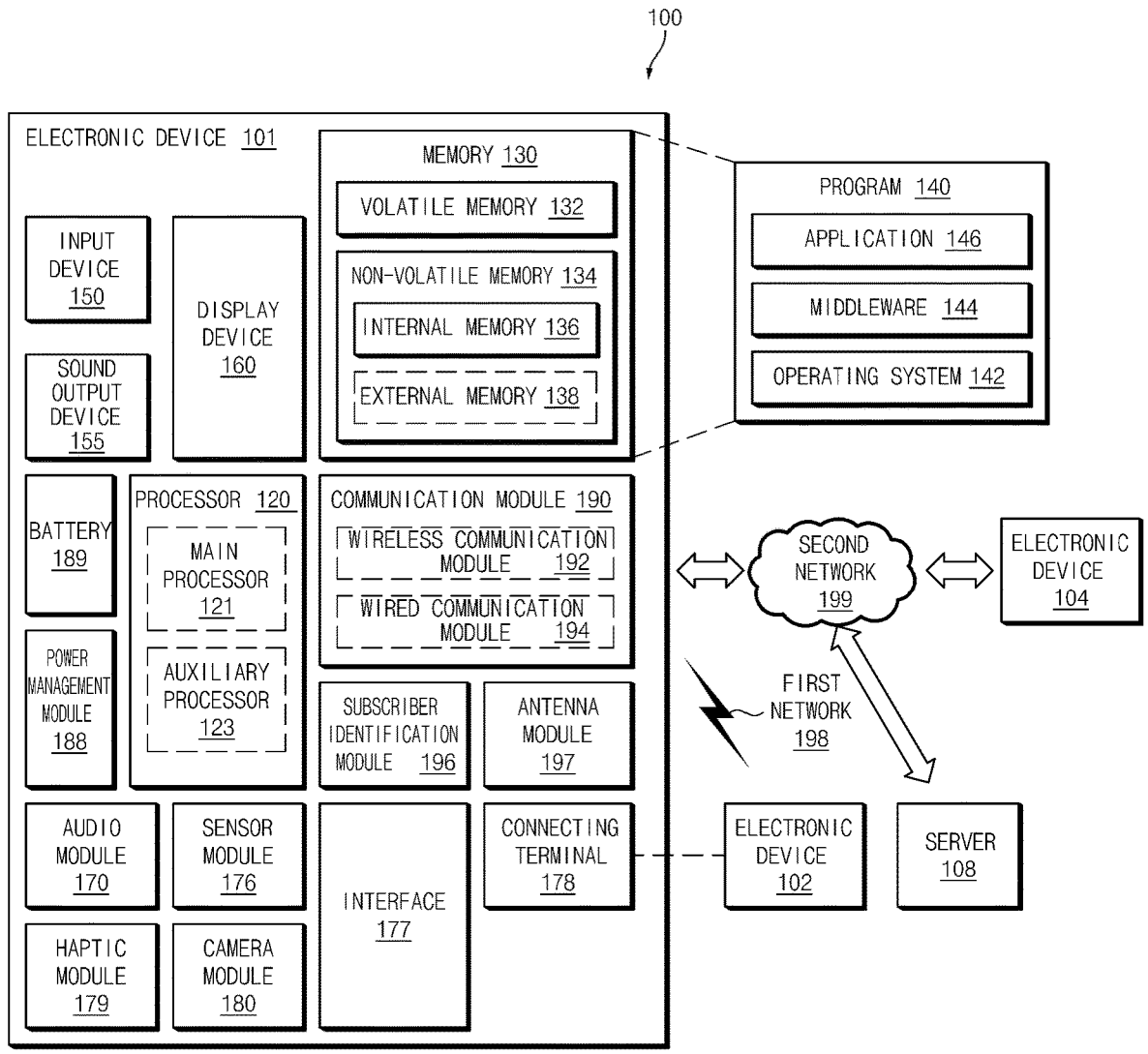
FIG. 1 is a block diagram illustrating an example electronic device in a network environment, according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an example embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an example embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service.

The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
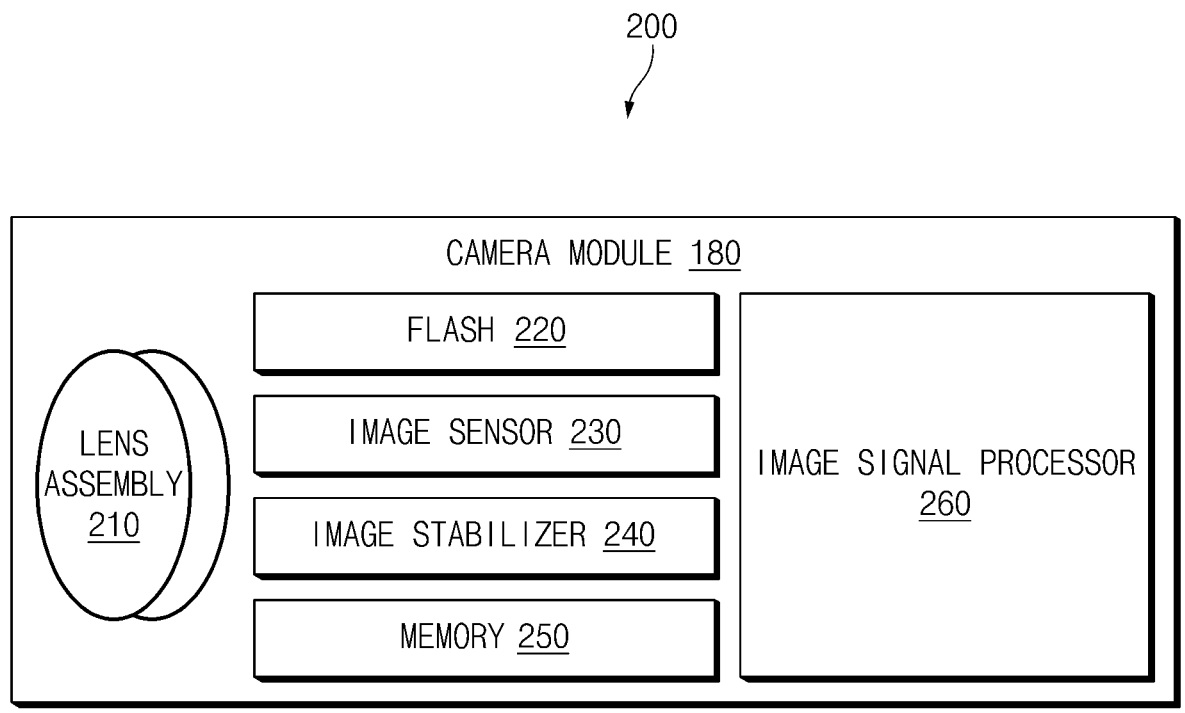
FIG. 2 is a block diagram illustrating an example camera module according to various embodiments.

FIG. 2 is a block diagram 200 illustrating an example of the camera module 180 according to various embodiments. Referring to FIG. 2, the camera module 180 may include a lens assembly 210, a flash 220, an image sensor 230, an image stabilizer (e.g., including image stabilizing circuitry) 240, memory 250 (e.g., buffer memory), or an image signal processor (e.g., including image processing circuitry) 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may include, for example, and without limitation, a dual camera, a 360-degree camera, a spherical camera, or the like. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, and without limitation, a wide-angle lens, a telephoto lens, or the like.

The flash 220 may emit light used to reinforce light reflected from an object. According to an embodiment, the flash 220 may include, for example, and without limitation, one or more light emitting diodes (LEDs) (e.g., a red-green-blue (RGB) LED, a white LED, an infrared (IR) LED, an ultraviolet (UV) LED), a xenon lamp, or the like. The image sensor 230 may obtain an image corresponding to an object by converting light emitted or reflected from the object and transmitted via the lens assembly 210 into an electrical signal. According to an embodiment, the image sensor 230 may include, for example, at least one selected from image sensors having different attributes, such as, for example, and without limitation, an RGB sensor, a black-and-white (BW) sensor, an IR sensor, a UV sensor, a plurality of image sensors having the same attribute, a plurality of image sensors having different attributes, or the like. Each image sensor included in the image sensor 230 may be implemented using, for example, and without limitation, a charged coupled device (CCD) sensor, a complementary metal oxide semiconductor (CMOS) sensor, or the like.

The image stabilizer 240 may include various circuitry and components configured to move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using, for example, and without limitation, a gyro sensor (not shown), an acceleration sensor (not shown), or the like disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. If a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various image signal processing circuitry and perform one or more image processing with respect to an image obtained via the image sensor 230 or an image stored in the memory 250. The one or more image processing may include, for example, and without limitation, depth map generation, three-dimensional (3D) modeling, panorama generation, feature point extraction, image synthesizing, image compensation (e.g., noise reduction, resolution adjustment, brightness adjustment, blurring, sharpening, or softening), or the like. The image signal processor 260 may perform control (e.g., exposure time control or read-out timing control) with respect to at least one (e.g., the image sensor 230) of the components included in the camera module 180. An image processed by the image signal processor 260 may be stored in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may include, for example, a wide-angle camera and at least another of the plurality of camera modules 180 may include a telephoto camera. Similarly, at least one of the plurality of camera modules 180 may include, for example, a front camera and at least another of the plurality of camera modules 180 may include a rear camera.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory storage medium" may refer, for example, to a tangible device, and may not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to various embodiments of the disclosure may be included and provided in a computer program product. The computer program product may be traded as a product between a seller and a buyer. The computer program product (e.g., downloadable app) may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
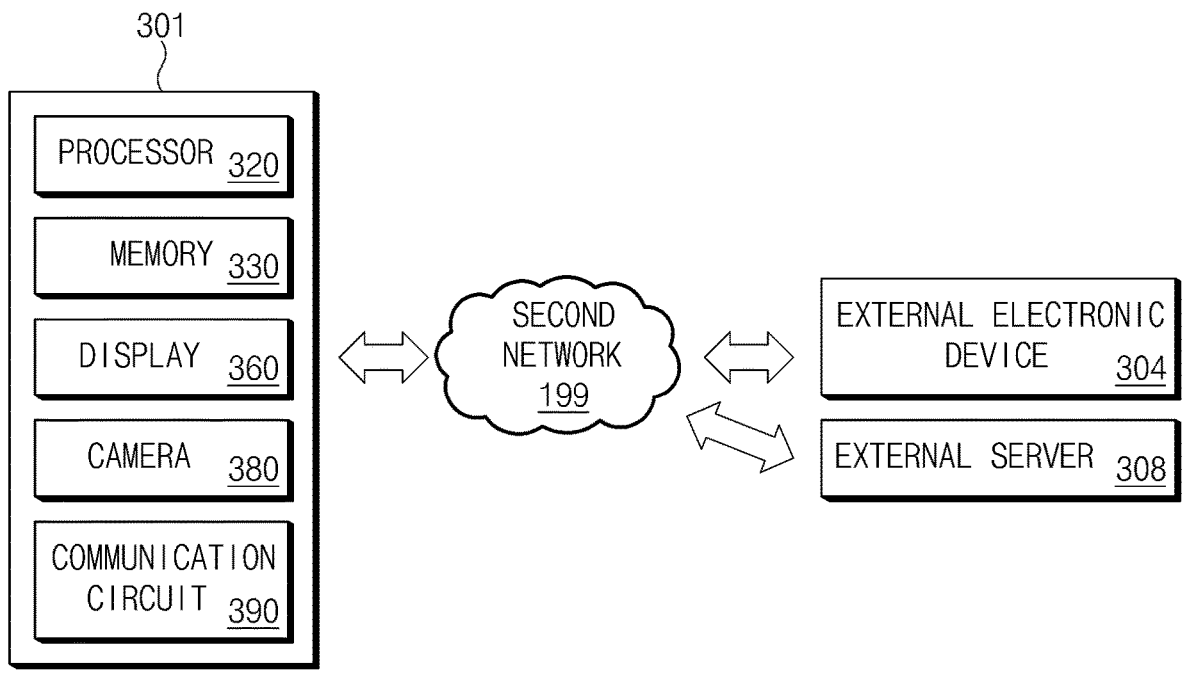
FIG. 3 is a block diagram of an example electronic device according to various embodiments.

FIG. 3 is a block diagram illustrating an example electronic apparatus according to various embodiments.

According to various embodiments, an electronic device 301 (e.g., the electronic device 101 of FIG. 1) may include a processor (e.g., including processing circuitry) 320 (e.g., the processor 120 of FIG. 1), a memory 330 (e.g., the memory 130 of FIG. 1), a display 360 (e.g., the display device 160 of FIG. 1), a camera 380 (e.g., the camera module 180 of FIG. 1), and/or a communication circuit 390 (e.g., the communication module 190 of FIG. 1).

According to an embodiment, the processor 320 may include various processing circuitry and be operatively connected to other configurations (e.g., the memory 330, the display 360, the camera 380, and/or the communication circuit 390) of the electronic device 301. The processor 320 may be configured to control other configurations of the electronic device 301. For example, the processor 320 may be configured to perform various operations of the electronic device 301 depending on one or more instructions stored in the memory 330.

According to an embodiment, the display 360 may display the image obtained through the camera 380 under the control of the processor 320. For example, the processor 320 may add the augmented reality object to the image obtained through the camera 380 to display the added result on the display 360 in real time.

According to an embodiment, the camera 380 may include one or more cameras. For example, the camera 380 may include at least one camera disposed on the front surface of the electronic device 301 and at least one camera disposed on the rear surface of the electronic device 301. For another example, the camera 380 may move to protrude from the inside of the housing of the electronic device 301 to the outside.

According to an embodiment, the communication circuit 390 may provide communication based on a specified communication protocol. For example, the communication circuit 390 may provide communication with an external electronic device 304 and/or an external server 308 via the second network 199.

According to an embodiment, the processor 320 may include various processing circuitry and identify a marker in an image based on a user input to the image displayed on the display 360, may identify at least one object associated with the marker, using marker information of the identified marker, may control the electronic device to display the identified at least one object on the display 360 as recommendation contents associated with the marker, and may map at least part of the at least one object to the marker based on a user input, to generate augmented reality contents. For example, the image displayed on the display 360 may include, for example, and without limitation, a still image obtained using the camera, a frame image of a video, an image stored in the memory 330, an image obtained from a network using the communication circuit 390, or the like. For example, the identified at least one object may include, for example, and without limitation, at least one of a 2-dimensional (2D) image, a 3D image, a video, a still image, music, or the like.

According to an embodiment, information of the marker may include, for example, and without limitation, at least one of at least one keyword identified from the marker, the location of the electronic device, the acquisition time of the marker, etc. The processor 320 may, for example, identify the at least one object by searching for an object corresponding to the marker information.

According to an embodiment, the processor 320 may identify the at least one object by searching the memory 330 or an external server 308 using the marker information.

According to an embodiment, the processor 320 may generate the augmented reality contents by generating a file including the marker, at least one object mapped to the marker, and mapping information. For example, the mapping information may include, for example, and without limitation, at least one of playback information of the mapped at least one object, playback authority information, location information of the marker, or the like.

According to an embodiment, the processor may control the electronic device to transmit the generated file, using the communication circuit 390.

According to various embodiments, the processor 320 may receive an augmented reality contents file from the external electronic device 304, using the communication circuit 390, may obtain a preview image, using the camera 380, and may overlay the preview image with at least one object of the augmented reality contents file corresponding to the identified marker to display the overlaid image on the display 360 when a marker included in the augmented reality contents file is identified from the preview image. For example, the at least one object may be at least one of a 2D image, a 3D image, a video, a still image, or music.

According to an embodiment, the processor 320 may play the at least one object at a location corresponding to the marker, using the mapping information included in the augmented reality contents file.

For example, the mapping information may include location information about the location of the marker. According to an embodiment, the processor 320 may identify the marker from the preview image, using the marker and the location information.

According to an embodiment, the processor 320 may receive address information from a base station, to which the electronic device is connected, using the communication circuit 390 and may receive the augmented reality contents file from an external electronic device, using the address information.

According to various example embodiments, the augmented reality contents generating method of the electronic device may include identifying a marker in an image based on a user input to the image displayed on the display, identifying at least one object associated with the marker, using marker information of the identified marker, displaying the identified at least one object on the display as recommendation contents associated with the marker, and mapping at least part of the at least one object to the marker based on a user input to generate augmented reality contents. For example, the image displayed on the display 360 may be a still image obtained using the camera 380 of the electronic device 301, a frame image of a video, an image stored in the memory 330, or an image obtained from a network using the communication circuit 390.

For example, information of the marker may include at least one of at least one keyword identified from the marker, the location of the electronic device, or the acquisition time of the marker. According to an embodiment, the identifying of the at least one object associated with the marker may include identifying the at least one object by searching for an object corresponding to the marker information.

According to an example embodiment, the identifying of the at least one object associated with the marker may include searching for the memory or an external server, using the marker information.

According to an example embodiment, the generating of the augmented reality contents may include generating the augmented reality contents by generating a file including the marker, at least one object mapped to the marker, and mapping information. For example, the mapping information may include at least one of playback information of the mapped at least one object, playback authority information, or location information of the marker.

The configurations of the electronic device 301 illustrated in FIG. 3 is an example, and the various embodiments of the disclosure are not limited thereto. For example, the electronic device 301 may further include a configuration not illustrated in FIG. 3. For another example, the electronic device 301 may not include at least one of the configurations illustrated in FIG. 3.

Figure 4:
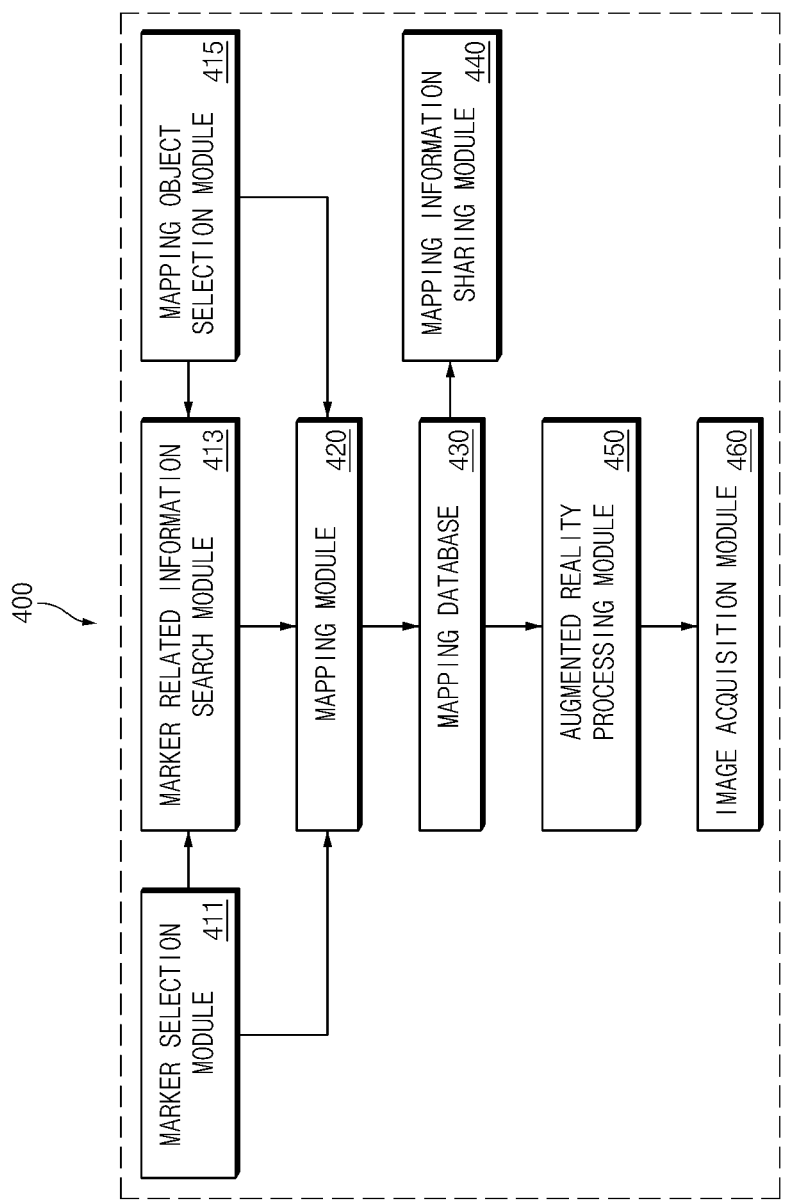
FIG. 4 is a software module block diagram illustrating an example software module of an example electronic device, according to various embodiments.

FIG. 4 is a software module block diagram 400 illustrating an example software block diagram of an example electronic device, according to various embodiments.

Referring to FIG. 4, an electronic device (e.g., the electronic device 301 of FIG. 3) may include various software modules each including various processing circuitry and/or executable program elements, including, for example, a marker selection module 411, a marker related information search module 413, a mapping object selection module 415, a mapping module 420, a mapping database 430, a mapping information sharing module 440, an augmented reality processing module 450, and/or an image acquisition module 460. For example, the configurations of the electronic device 301 illustrated in FIG. 4 may be software modules generated as a processor (e.g., the processor 320 of FIG. 3) executes one or more instructions stored in the memory (e.g., the memory 330 of FIG. 3) of the electronic device 301.

According to an embodiment, the marker selection module 411 may include various processing circuitry and/or executable program elements and receive the selection of a marker image from a user of the electronic device 301. For example, the marker selection module 411 may provide a display (e.g., the display 360 of FIG. 3) with an image for marker selection (e.g., the image obtained from the camera (e.g., the camera 380 of FIG. 3) of the electronic device 301, the image stored in the memory (e.g., the memory 330 of FIG. 3) of the electronic device 301, the video frame obtained by the camera 380, or the video frame stored in the memory 330). For example, the marker selection module 411 may identify a marker (e.g., a marker image) based on a user input to the image for marker selection.

According to an embodiment, the marker related information search module 413 may include various processing circuitry and/or executable program elements and search for information associated with the marker identified by the marker selection module 411. For example, the marker related information search module 413 may search for information associated with a marker based on at least one of the identified marker image, the keyword obtained from the marker image, and/or a marker acquisition location. For example, the marker related information search module 413 may search for at least one media stored in the memory 330, using at least one of an image of the marker, a keyword, and/or a marker acquisition location. For another example, the marker related information search module 413 may transmit at least one of the image of the marker, the keyword, and/or the marker acquisition location to an external server (e.g., the external server 308 of FIG. 3) and may receive the found result from the external server 308. The marker related information search module 413 may provide the display 360 with at least part of the found result.

According to an embodiment, the mapping object selection module 415 may include various processing circuitry and/or executable program elements and provide an interface for selecting an object to be mapped to a marker. For example, the mapping object selection module 415 may identify at least one object among the at least one object found by the marker related information search module 413 and/or a user addition object, as a selection object based on a user input.

According to an embodiment, the mapping module 420 may include various processing circuitry and/or executable program elements and generate the mapping between the identified marker and the selection object. For example, the mapping module 420 may generate mapping information between the identified marker and the selection object. The mapping module 420 may store the generated mapping information in the mapping database 430. For example, the mapping information may include information of the identified marker and information of at least one object associated with the marker. For another example, the mapping information may further include playback information indicating a method of playing the object and/or authority information indicating whether to allow the playback of the object. For example, the playback information may include the playback order, playback time information, and/or object switching effect information of at least one object.

According to an embodiment, the mapping database 430 may include various processing circuitry and/or executable program elements and store the mapping information. For example, the mapping database 430 may be stored in the memory 330 of the electronic device 301. For another example, at least part of the mapping database 430 may be stored in a cloud server (e.g., the external server 308 of FIG. 3). According to an embodiment, the mapping database 430 may further store the marker and object, which are associated with the mapping information.

According to an embodiment, the mapping information sharing module 440 may include various processing circuitry and/or executable program elements and transmit the generated augmented reality contents to another electronic device. For example, the mapping information sharing module 440 may transmit a file including augmented reality contents to an external electronic device based on a user input. For example, the file (e.g., the file of extension 'pnk') including the augmented reality contents may include marker information, mapping information, and at least one mapping object information. For example, the mapping information sharing module 440 may generate a single file (e.g., the file of extension 'pnk') including a marker, mapping information, and at least one object mapped to the marker, using the mapping information of the mapping database 430. The mapping information sharing module 440 may share the mapping information by transmitting the generated file to the external electronic device. For another example, the mapping information sharing module 440 may share the mapping information by transmitting the file (e.g., the file of extension 'pnk') generated by the mapping module 420 to the external electronic device.

According to an embodiment, the augmented reality processing module 450 may include various processing circuitry and/or executable program elements and obtain an image from the image acquisition module 460. For example, the image acquisition module 460 may obtain an image (e.g., a preview image) from the camera 380 in real time. The augmented reality processing module 450 may identify a marker from the image received from the image acquisition module 460 and may overlay and provide an object mapped to a location corresponding to the identified marker, using the mapping information.

Figure 5:
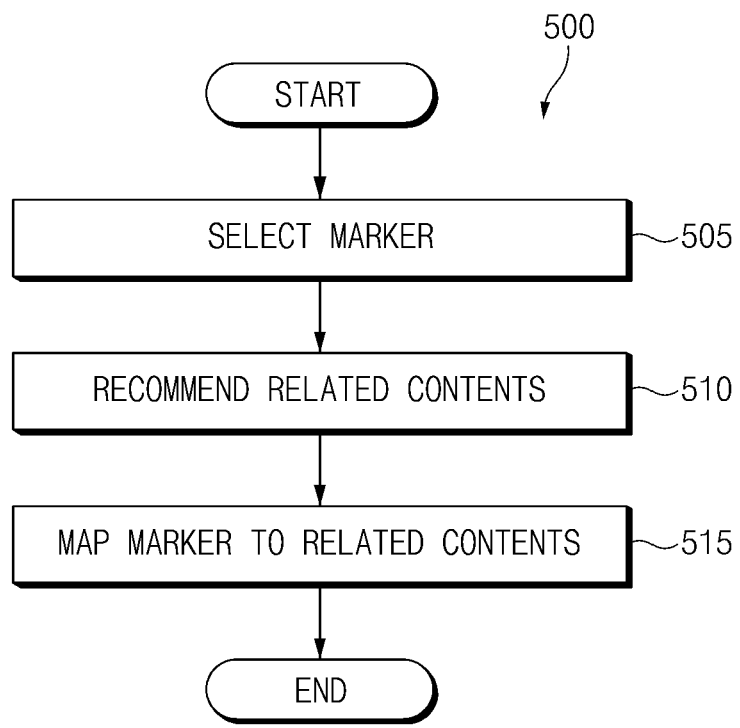
FIG. 5 is a flowchart illustrating an example method of creating augmented reality contents, according to various embodiments.

FIG. 5 is a flowchart 500 illustrating an example method of creating augmented reality contents, according to various embodiments.

According to an embodiment, in operation 505, the processor (e.g., the processor 320 of FIG. 3) of an electronic device (e.g., the electronic device 301 of FIG. 3) may select a marker. For example, the processor 320 may receive an input (e.g., a user input) to a display (e.g., the display 360 of FIG. 3) and may select the marker based on the user input. The processor 320 may display an image obtained from a camera (e.g., the camera 380 of FIG. 3), a memory (e.g., the memory 330 of FIG. 3), or an external server (e.g., the external server 308 of FIG. 3), on the display. For example, the processor 320 may display an image obtained using the camera 380, an image stored in the memory 330, an image corresponding to a specific frame of a video, or an image obtained from an external server 308 using the communication circuit 390, on the display.

According to an embodiment, the processor 320 may provide a guide for selecting a marker on an image. For example, the processor 320 may identify a marker in the image displayed on the display 360, based on a user input to the guide. The processor 320 may select a marker based on a user input indicating the selection of the identified marker.

According to an embodiment, in operation 510, the processor 320 may recommend related contents associated with the selected marker. For example, the processor 320 may identify at least one object associated with a marker, by searching for the memory 330 or the external server 308 based on the image of the selected marker, the object identified from the image, the keyword extracted from the image, information about the image exchangeable image file format (exif), and/or the image acquisition location. The processor 320 may display information of the identified at least one object as related contents, on the display 360. At least one object may include an image, a video, a motion photo (e.g., the combination of an image and a video), music, and/or a media group (e.g., at least one multimedia file grouped into a single story or album). For example, the processor 320 may identify the video of the motion photo as an object corresponding to the related contents. For example, the processor 320 may identify all media files grouped into the single story as an object corresponding to related contents. The single story or album may be referred to as a group of multimedia files grouped based on a specific time, place, person, user selection, and/or event.

According to an embodiment, the processor 320 may prompt the user whether to allow the recommendation of the specific type, to recommend the related contents of the specific type. For example, when the found object is a motion photo or story, the processor 320 may prompt the user whether to allow the recommendation of the motion photo or story and may recommend the motion photo or story as the related contents in response to the user's permission input.

According to an embodiment, in operation 515, the processor 320 may map a marker to the related contents. For example, the processor 320 may map a marker to at least one object (e.g., related contents) based on a user input to select the related contents. For example, the related contents mapped to the marker may be the related contents recommended by operation 510 and/or the related contents directly selected by the user. For example, the processor 320 may generate mapping information in which a marker is mapped to the related contents and may store the generated mapping information in the memory 330 or the external server 308. According to an embodiment, the processor 320 may store the mapping information together with the marker and the related contents.

Figure 6A:
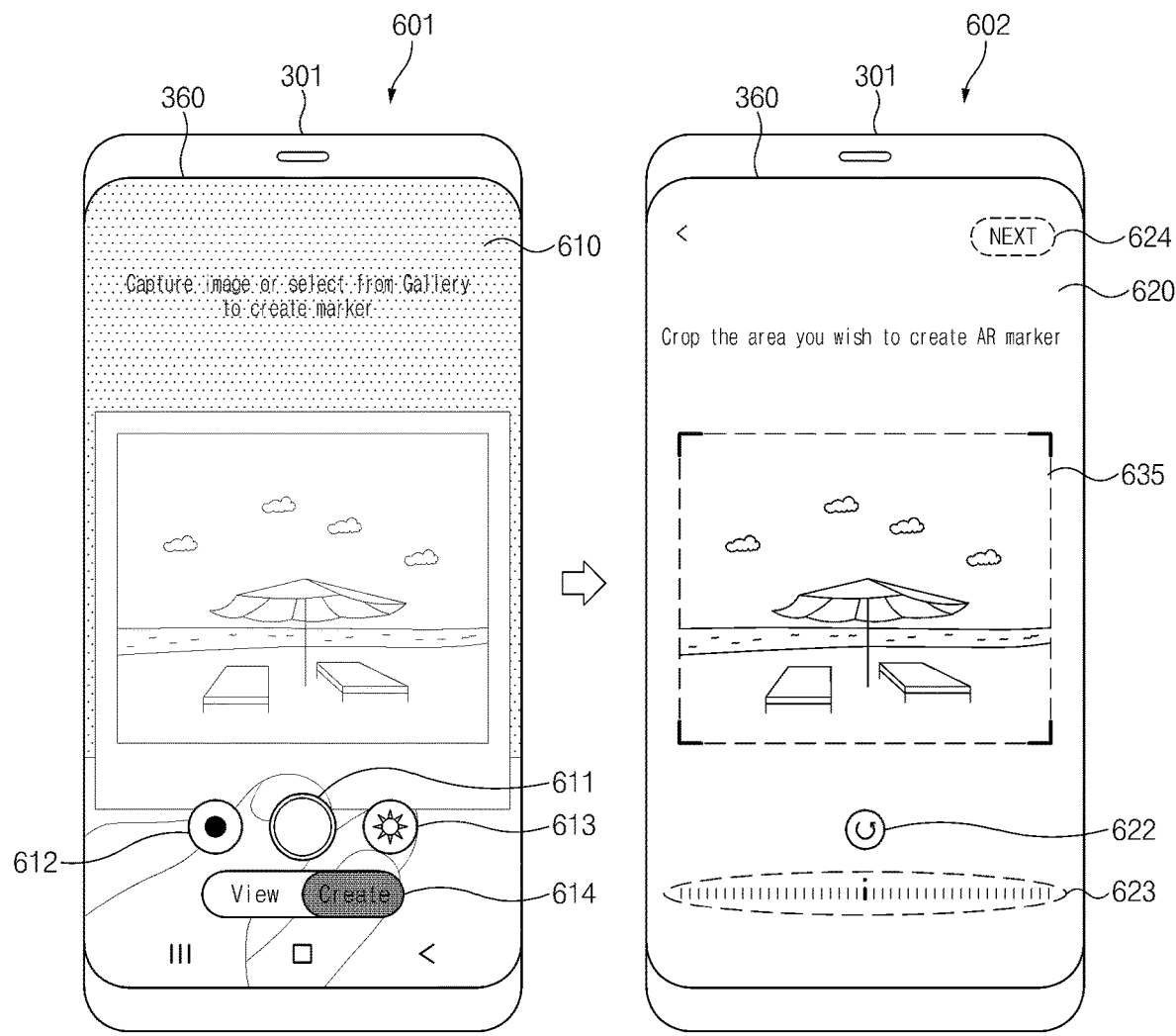
FIG. 6A is a diagram illustrating an example marker selection interface, according to various embodiments.

FIG. 6A is a diagram illustrating an example marker selection interface, according to various embodiments.

Referring to reference numeral 601, the electronic device 301 may display a first execution screen 610 on the display 360. For example, the electronic device 301 may display the first execution screen 610 in response to the execution of an application (hereinafter, AR application) for creating augmented reality contents. A mode selection interface 614 may be displayed at the lower end of the first execution screen 610. For example, the user may change the execution mode of the AR application to a creating mode or a viewing mode through an input to the mode selection interface 614. For example, the first execution screen 610 may correspond to the execution screen of the AR application in the creating mode.

According to an embodiment, the electronic device 301 may display the image (e.g., a preview image) obtained by a camera (e.g., the camera 380 of FIG. 3) on the first execution screen 610 in real time. For example, the electronic device 301 may display interfaces 611, 612, and 613 for generating a marker on the first execution screen 610.

Referring to reference numeral 602, for example, when an input to a button is received at the image capture button 611, the electronic device 301 may display a second execution screen 620 including an image obtained by the camera 380 and a marker area guide 635, on the display 360. For example, the electronic device 301 may identify an image area set based on a user input to the marker area guide 635, as a marker. According to an embodiment, the electronic device 301 may display a rotation button 622 for rotating the marker area guide 635 and a rotation slider 623. For example, when an input to the rotation button 622 is received, the electronic device 301 may rotate the marker area guide 635 in the specified direction (e.g., counterclockwise) by the specified angle (e.g., 90 degrees). For example, when a drag input to the rotation slider 623 is received, the electronic device 301 may rotate the marker area guide 635 at an arbitrary angle in response to the drag input. According to an embodiment, when an input to a selection complete button 624 is received, the electronic device 301 may identify an image area in the marker area guide 635, as a marker.

Embodiments of the disclosure are not limited to the procedure illustrated in FIG. 6A. According to an embodiment, when an input to a button is received at the image capture button 611, the electronic device 301 may identify at least part of the image obtained by the camera 380, as a marker. For example, the electronic device 301 may identify the whole obtained image as a marker. For another example, the electronic device 301 may identify an object (e.g., an object positioned at the center of the image) from the obtained image and may identify the identified object as a marker. In this case, the electronic device 301 may omit the providing of the second execution screen 620.

Figure 7:
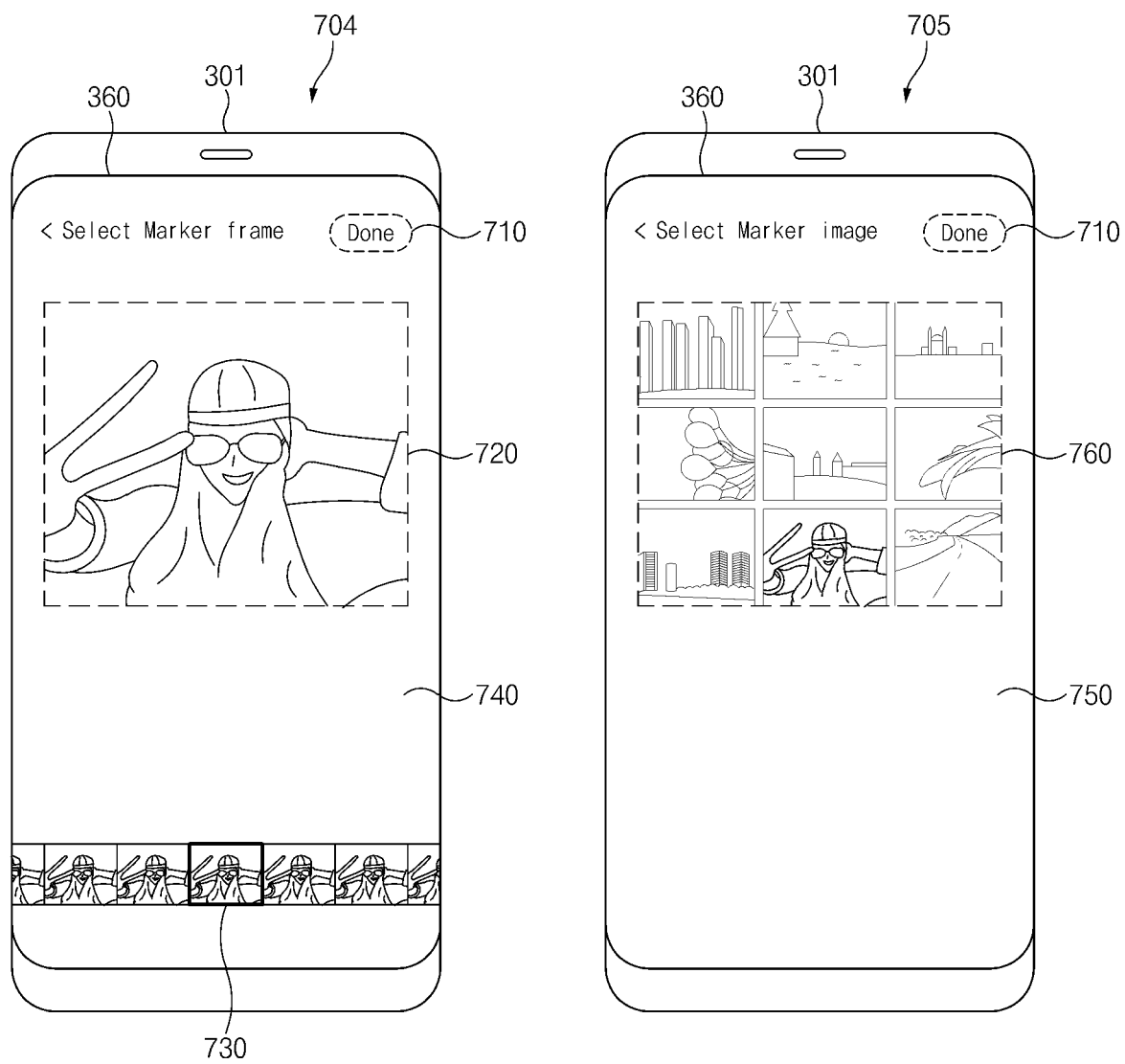
FIG. 7 is a diagram illustrating example marker image selection interfaces, according to various embodiments.

FIG. 7 is a diagram illustrating example marker image selection interfaces, according to various embodiments.

Referring to FIG. 6A, an input to the image capture button 611 will be described for convenience. However, embodiments of the disclosure are not limited thereto. For example, the electronic device 301 may display a fourth execution screen 740 on the display 360 in response to an input to the video button 612 of FIG. 6A. Referring to reference numeral 704 and reference numeral 705, for example, the electronic device 301 may provide a plurality of images 760 corresponding to the videos stored in the memory 330 and may display the fourth execution screen 740 in response to an input to select one of the plurality of images 760. For another example, when the input to the video button 612 of FIG. 6A is received, the electronic device 301 may capture a video; when video recording is terminated, the electronic device 301 may provide the fourth execution screen 740. According to an embodiment, the electronic device 301 may display a frame selection guide 730 for selecting the frame of the video on the fourth execution screen 740. The electronic device 301 may change a frame image 720 displayed on the fourth execution screen 740 into another frame, based on the input to the frame selection guide 730. When the input to a complete button 710 is received, the electronic device 301 may provide an interface for selecting a marker for the frame image 720 displayed on the display 360. For example, the electronic device 301 may provide an interface for selecting a marker in a manner similar to that described above with reference to reference numeral 602 of FIG. 6A.

For example, the electronic device 301 may display a fifth execution screen 750 on the display 360 in response to an input to an image selection button 613 of FIG. 6A. Referring to reference numeral 705, for example, the electronic device 301 may display the plurality of images 760 stored in the memory 330 on the fifth execution screen 750. For example, the electronic device 301 may identify an image to be used for marker selection, based on an input to one of the plurality of images 760. After identifying the image, the electronic device 301 may provide an interface for marker selection for the identified image, on the display 360. For example, the electronic device 301 may provide an interface for selecting a marker in a manner similar to that described above with reference to reference numeral 602 of FIG. 6A.

Figure 6B:
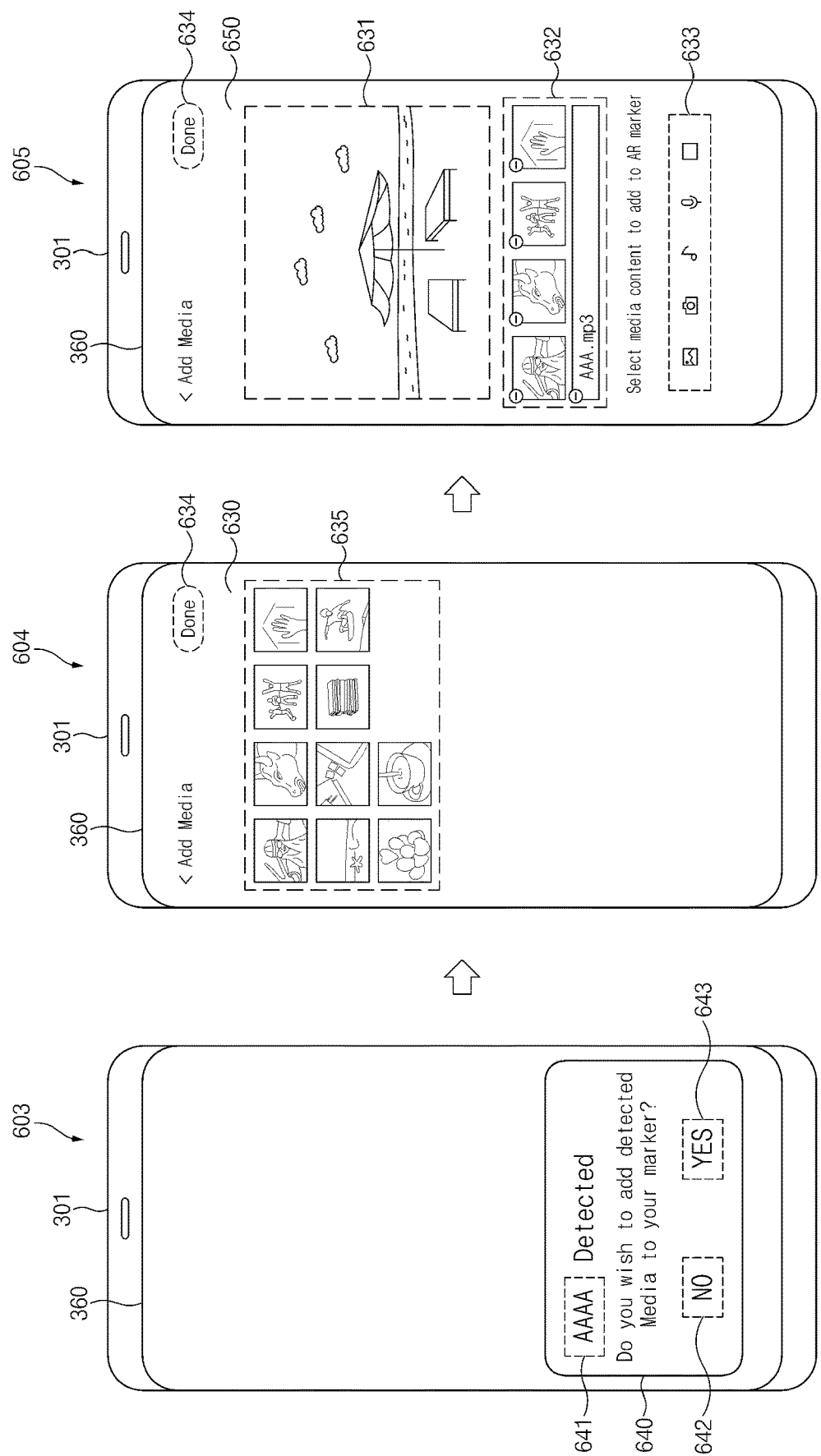
FIG. 6B is a diagram illustrating an example object mapping interface, according to various embodiments.

FIG. 6B is a diagram illustrating an example object mapping interface, according to an embodiment.

Referring to reference numeral 603 of FIG. 6B, for example, the electronic device 301 may identify at least one object associated with the identified marker, in response to receiving the input to the selection complete button 624 (e.g., a button for progressing the next step) of FIG. 6A. According to an embodiment, the electronic device 301 may prompt the user whether to add the identified object. For example, the electronic device 301 may provide a pop-up message 640. The pop-up message 640 may include type information 641 of the detected object. For example, the type information 641 may include information indicating the type (e.g., a still image, a video, a motion photo, and/or a story) of the found media. For another example, when there is no identified object, the electronic device 301 may omit the pop-up message 640. According to an embodiment, the pop-up message 640 may be omitted. In this case, the electronic device 301 may provide a third execution screen 630 of reference numeral 604 without providing the pop-up message 640. According to an embodiment, the electronic device 301 may provide the pop-up message 640 to only the object of a specified type, but the disclosure is not limited thereto. For example, only when the type of the found media is a motion photo and/or a story, the electronic device 301 may provide the pop-up message 640.

According to an embodiment, referring to reference numeral 604, the electronic device 301 may display an object list 635 for the identified marker on the third execution screen 630. For example, the third execution screen 630 may include the identified marker 631. For example, the electronic device 301 may provide the third execution screen 630 in response to an input to "YES" 643 of the pop-up message 640. According to an embodiment, the object list 635 may include information of objects found (e.g., operation 510 of FIG. 5) based on the identified marker 631. According to an embodiment, the electronic device 301 may add an object corresponding to an input to at least part of the images of the object list 635 to an object playlist 632.

Figure 8:
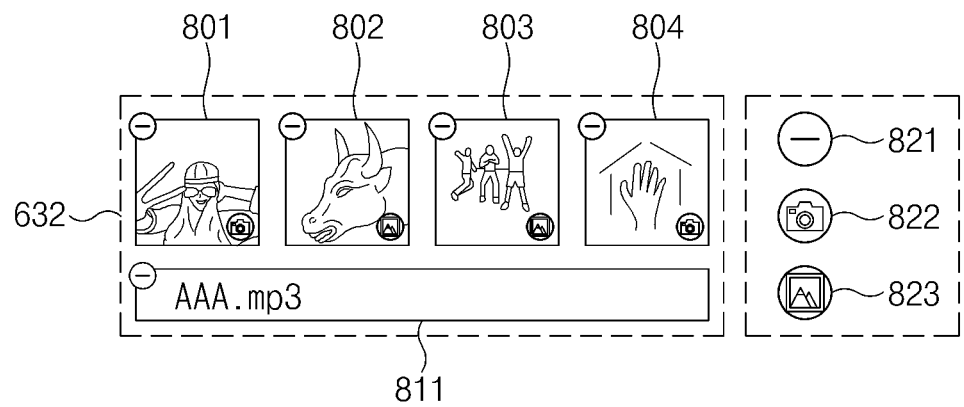
FIG. 8 is a diagram illustrating an example object playlist, according to various embodiments.

For example, the user may select first to fourth object images (e.g., first to fourth object image 801, 802, 803, and 804 of FIG. 8) from the object list 635 and may perform an input to a complete button 634.

According to an embodiment, referring to 605, the electronic device 301 may provide a fourth execution screen 650 including the object playlist 632. For example, the object playlist 632 may include information of the objects to be mapped to the marker 631. For example, the object playlist 632 may include at least one object (e.g., the selected object) of the object list 635 and a user addition object (e.g., fifth object 811 of FIG. 8). In the example of reference numeral 605, the user of the electronic device 301 may select at least one object through an input to an additional object 633 and may add the selected object to the object playlist 632.

FIG. 8 is a diagram illustrating an example object playlist 632, according to various embodiments. According to various embodiments, the electronic device 301 may display at least one object found in the object list 632. For example, the object list 632 may include the first object image 801, the second object image 802, the third object image 803, the fourth object image 804, and the fifth object information 811. According to an embodiment, the electronic device 301 may display object information selected by a user in the object playlist 632 and/or object information added by the user.

As illustrated in FIG. 8, the electronic device 301 may differently display information of an object depending on the type of object. According to an embodiment, when the media type of the object includes an image, the electronic device 301 may display an image corresponding to the object in the object playlist 632. When the media type of the object does not include an image, the electronic device 301 may display the information (e.g., a file name, an artist name, and/or a title) of the object. For example, the first object image 801 may correspond to one frame of the video corresponding to the first object. For example, the second object image 802 may be a preview of an image or a representative image (e.g., thumbnail) corresponding to the second object. For example, the third object image 803 may be the thumbnail of an image corresponding to the third object. For example, the fourth object image 804 may correspond to one frame of the video corresponding to the fourth object. For example, the fifth recommendation object image information 811 may include information (e.g., a file name, an artist name, and/or a title) of recommendation music. For another example, the fifth object information 811 may further include an album jacket image, an artist image, and/or a music-related image.

According to an embodiment, the electronic device 301 may display information indicating the type of object together with information (e.g., an image, a file name, an artist name, and/or a title) of an object. For example, the electronic device 301 may display a video icon 822 corresponding to the media type of each of the first object and the fourth object on the first object image 801 and the fourth object image 804. For example, the electronic device 301 may display an image icon 823 corresponding to the media type of each of the second object and the third object on the second object image 802 and the third object image 803.

According to an embodiment, the electronic device 301 may display a button 821 for deleting the object together with the information of the object. For example, the electronic device 301 may display a delete button 821 on each of the first object image 801, the second object image 802, the third object image 803, the fourth object image 804, and the fifth object information 811. For example, when an input to one of the delete buttons 821 is received, the electronic device 301 may delete the corresponding object from the object list 636.

According to an embodiment, the electronic device 301 may display the object addition interface 633 on the fourth execution screen 650. For example, the electronic device 301 may provide an interface for generating or selecting the media of the type selected based on the input, based on an input to the object addition interface 633. The object addition interface 633 may be a user interface for the addition of multimedia (e.g., a still image, a video, music, a text, user drawing, and/or GIF animation) of the type corresponding to the selection of the user. The object selected through the object addition interface 633 may be added to the object playlist 632.

According to an embodiment, the object playlist 632 may indicate object playback information, the playback order of objects, and/or a playback method. For example, the user may select first to fourth objects (e.g., the first to fourth object images 801, 802, 803, and 804) from the object list 635 in reference numeral 604 and may add music (e.g., AAA.mp3) to the object playlist 632. In the example of the reference numeral 605, the object playlist 632 may indicate that the set music AAA.mp3 is played, while a first object (e.g., an object corresponding to the first object image 801 of FIG. 8), a second object (e.g., an object corresponding to the second object image 802 of FIG. 8), a third object (e.g., an object corresponding to the third object image 803 of FIG. 8), and the fourth object (e.g., an object corresponding to the fourth object image 804 of FIG. 8) are sequentially played.

According to an embodiment, the electronic device 301 may change the playback information, playback order, and/or playback method of objects of the object playlist 632. For example, similarly to that described above in connection with the object list 635, the user may delete at least one of objects of the object playlist 632. For another example, the user may change the playback order of objects in the object playlist 632 by changing the input to object images in the object playlist 632. For still another example, the user may change the playback method (e.g., playback time) of the corresponding object through an input to the object image within the object playlist 632.

According to an embodiment, in reference numeral 605, the electronic device 301 may associate objects in object playlist 632 with the marker 631, in response to an input to the complete button 634. For example, the electronic device 301 may generate mapping information indicating the relationship between the marker 631 and objects of the object playlist 632.

The operations of the electronic device 301 described with reference to FIG. 6B is merely an example, and embodiments of the disclosure are not limited thereto. For example, unlike the illustration of FIG. 6B, when an input to "NO" 642 in reference numeral 603 is received, the third execution screen 630 may be omitted. For another example, the electronic device 301 may display the marker 631 and the object playlist 632 in an empty state, on the fourth execution screen 650 in response to the input to the "NO" 642. For still another example, the electronic device 301 may omit the object playlist 632 from the fourth execution screen 650 in response to the input to the "NO" 642.

According to an embodiment, the electronic device 301 may provide the third execution screen 630 in response to an input to the selection complete button 624 of FIG. 6A. In this case, the provision of the pop-up message 640 in reference numeral 603 may be omitted. For example, the electronic device 301 may display the object list 635 including at least one object associated with a marker, on the third execution screen 630. For another example, when there is no object identified associated with a marker, the electronic device 301 may omit the third execution screen 630 or may display the empty object list 635 on the third execution screen 630.

Figure 9:
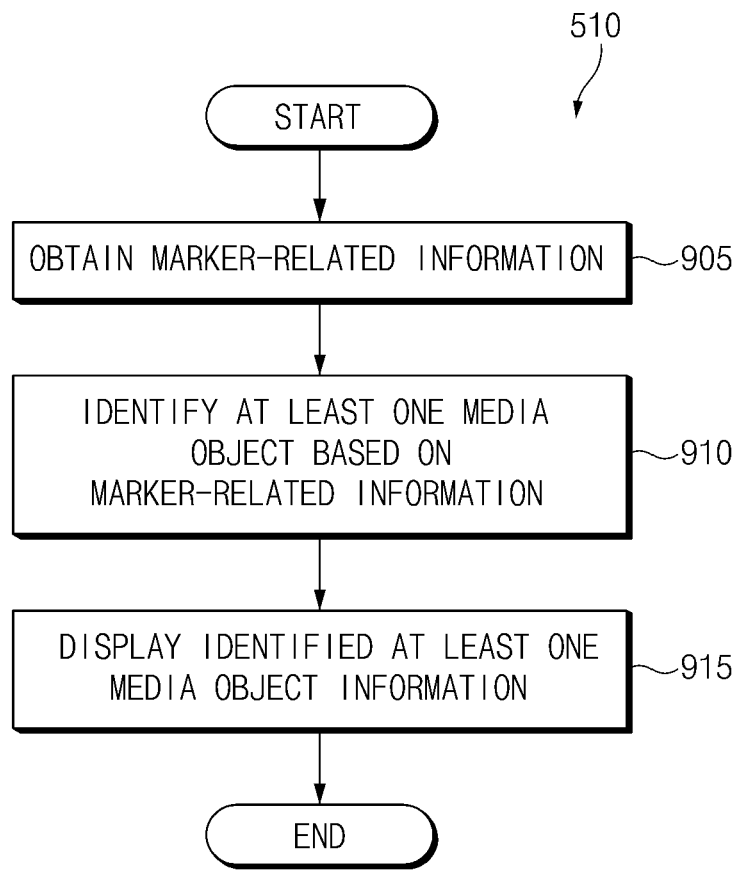
FIG. 9 is a flowchart illustrating an example method of recommending an object, according to various embodiments.

FIG. 9 is a flowchart illustrating an example method 510 of recommending an object, according to an embodiment.

According to various embodiments, in operation 905, a processor (e.g., the processor 320 of FIG. 3) of an electronic device (e.g., the electronic device 301 of FIG. 3) may obtain marker-related information. For example, the processor 320 may obtain the marker-related information (e.g., a keyword corresponding to an object) by identifying at least one object from a marker image. For example, the processor 320 may obtain the marker-related information from the acquisition time of a marker image. For example, the processor 320 may obtain the marker-related information from exif information of the marker image. For example, the processor 320 may obtain the marker-related information by identifying a category (e.g., a category based on image analysis of the marker image (e.g., a person, a plant, a background, a food, or the like)) of the marker image. For example, the processor 320 may obtain the marker-related information from the acquisition location of the marker image. For example, the processor 320 may obtain the marker-related information from a tag of the marker image. The marker-related information may include the exif information, the acquisition time of the marker image, the category, the acquisition location, and/or the tag.

According to various embodiments, in operation 910, the processor 320 may identify at least one media object (e.g., recommendation contents) based on the marker-related information. For example, the processor 320 may search for at least one media object corresponding to the marker-related information from a memory (e.g., the memory 330 of FIG. 3) or an external server (e.g., the external server 308 of FIG. 3). The processor 320 may identify the at least one media object from the found result.

For example, the processor 320 may identify a person from the marker and may identify the media object including the identified person. For another example, the processor 320 may identify a place, at which a marker image is obtained from a marker, and may identify a media object corresponding to the place. The processor 320 may identify the media object for each of a place, at which the marker image is obtained, and an image obtained within a critical distance. For still another example, the processor 320 may identify time information, at which the marker image is obtained from the marker, and may identify a media group corresponding to the identified time as a media object. In this case, the processor 320 may identify the media obtained within the critical time range from the acquisition time of the marker image, as media objects. For yet another example, the processor 320 may identify the tag of a marker and may identify at least one media (e.g., media group) corresponding to the identified tag as a media object.

According to an embodiment, the processor 320 may obtain group information (e.g., a photo album, a folder, or a story) of a marker and may identify the media included in the obtained group of the marker as a media object for the marker. For example, when the marker image corresponds to an image belonging to the story titled "travel to Hawaii", the processor 320 may identify other images belonging to "travel to Hawaii", as the media object for the marker.

According to an embodiment, the processor 320 may identify a motion photo as the media object associated with the marker. For example, the motion photo may include an image and a video associated with the image. When the motion photo is identified as a media object, the processor 320 may identify whether to recommend the video of the motion photo as the media object, to the user. For another example, the processor 320 may recommend the video of the motion photo as the media object without notifying the user.

According to an embodiment, the processor 320 may identify an image corresponding to the single frame of the video as a marker. In this case, the processor 320 may identify the video including the frame corresponding to the marker as a media object associated with the marker.

According to an embodiment, the processor 320 may identify a story as the media object associated with the marker. The story may be a media group including a plurality of media (e.g., a plurality of images and/or videos). For example, the processor 320 may identify the story corresponding to the acquisition time and/or location of the marker as the media object associated with the marker. For another example, the processor 320 may identify the story corresponding to the tag of the marker, as the media object associated with the marker. For still another example, the processor 320 may identify the story corresponding to the person of the marker as the media object associated with the marker.

According to an embodiment, the processor 320 may obtain group information (e.g., a photo album, a folder, or a story) of a marker and may identify the media included in the obtained group of the marker as a media object for the marker. For example, when the marker image corresponds to an image belonging to the story titled "travel to Hawaii", the processor 320 may identify other images belonging to "travel to Hawaii", as the media object for the marker.

According to various embodiments, in operation 915, the processor 320 may display the identified at least one media object information on a display (e.g., the display 360 of FIG. 3). For example, the processor 320 may display at least one media object information in the object list 635 of FIG. 6B.

As described above with reference to FIGS. 5, 6A, 6B, 7, 8 and 9, the electronic device 301 may generate augmented reality contents including a marker, at least one object, and mapping information. According to an embodiment, the electronic device 301 may provide an editing function for the augmented reality contents. For example, the electronic device 301 may provide an interface for a marker. For example, the electronic device 301 may provide a marker interface that provides deletion, sharing, image editing, and/or printing of a marker. For example, the electronic device 301 may provide an editing interface for editing an image of a marker. The editing interface may provide the resizing, cropping, and/or rotation of a marker image.

According to an embodiment, the electronic device 301 may include the playback information of at least one object associated with a marker in the mapping information. The electronic device 301 may include playback information, authority information, and/or effect information in the mapping information.

For example, the playback information may include information about the playback time and/or playback order of an object. For another example, the electronic device 301 may include authority information for playing the augmented reality contents in the playback information. The authority information may include information (e.g., an electronic device in which a specific application is installed, an identifier of the electronic device, and/or a telephone number) of an electronic device capable of playing the corresponding augmented reality contents. For still another example, the electronic device 301 may include effect information of the augmented reality contents in the playback information. For example, the effect information may include information about an effect (e.g. switching effect between objects) used when the object corresponding to a marker is played.

Figure 10:
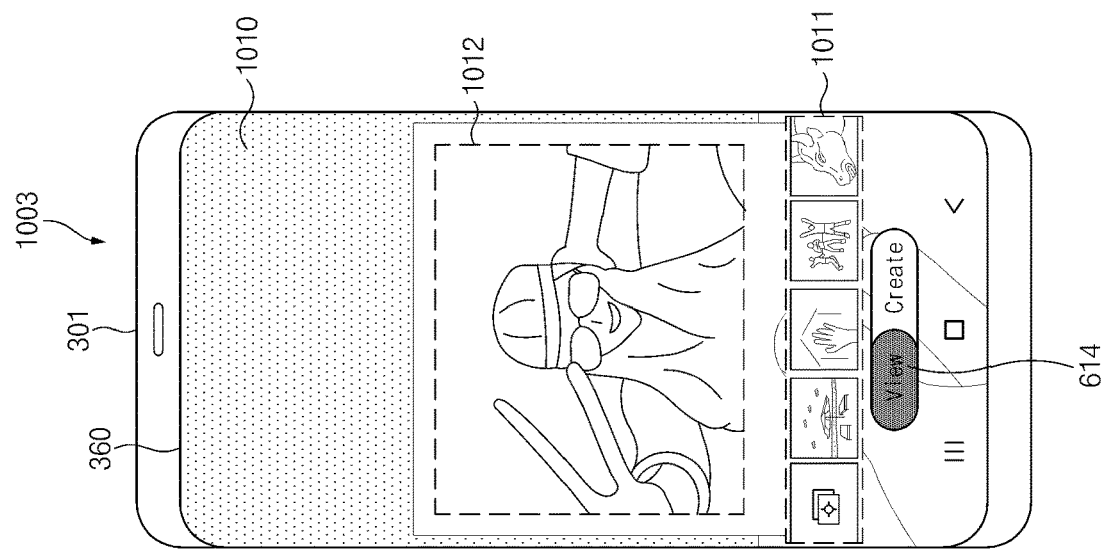
FIG. 10 is a diagram illustrating an example augmented reality contents providing interface, according to various embodiments.
Figure 10:
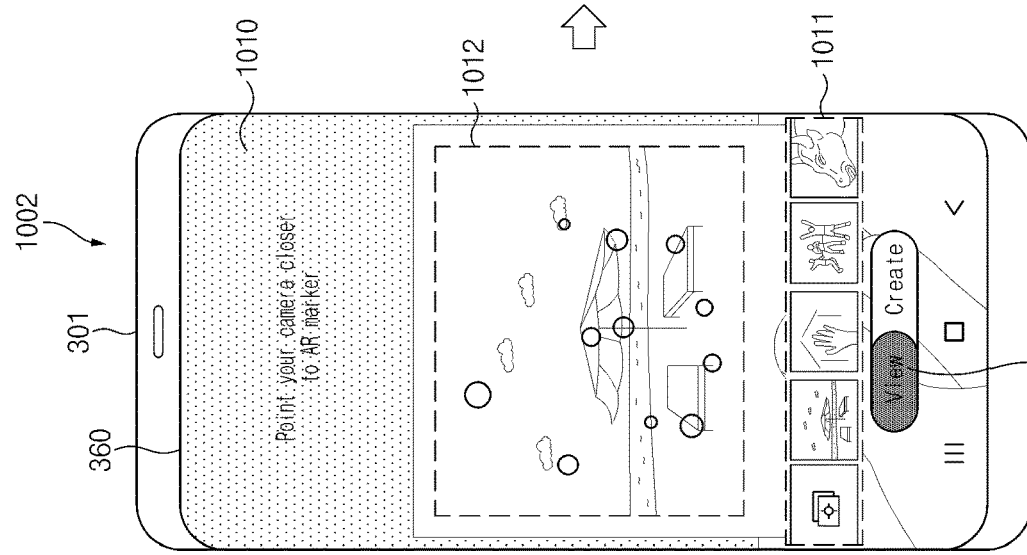
Figure 10:
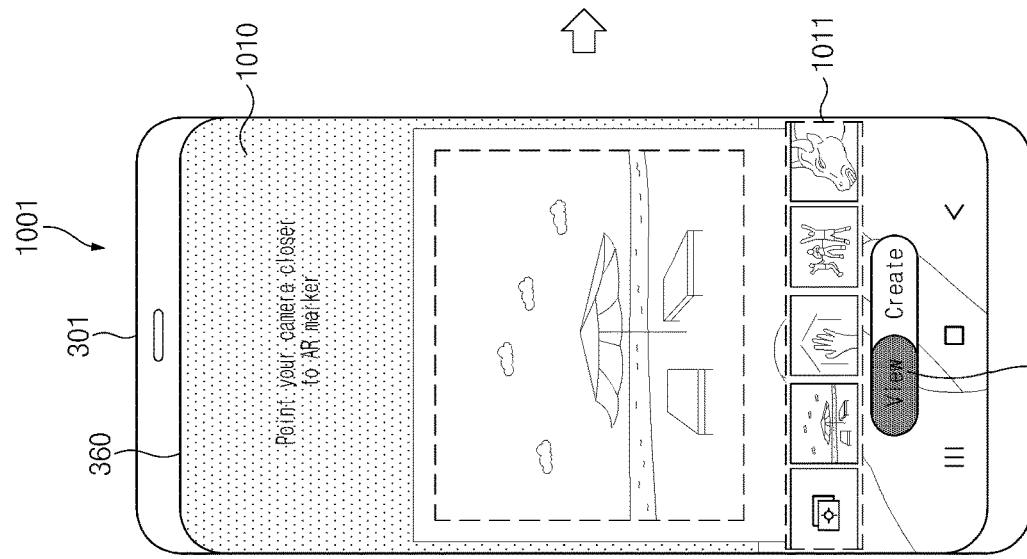

FIG. 10 is a diagram illustrating an example augmented reality contents providing interface, according to various embodiments.

According to various embodiments, referring to reference numeral 1001, the electronic device 301 may display a first viewing screen 1010 on the display 360. For example, the electronic device 301 may display the first viewing screen 1010 in response to the execution of an AR application. The mode selection interface 614 may be displayed at the lower end of the first viewing screen 1010. For example, the user may change the execution mode of the AR application to a creating mode or a viewing mode through an input to the mode selection interface 614. For example, the first viewing screen 1010 may correspond to the execution screen of the AR application in a viewing mode.

According to an embodiment, the electronic device 301 may display the image (e.g., preview image) obtained by a camera (e.g., the camera 380 of FIG. 3) on the first viewing screen 1010 in real time. For example, the electronic device 301 may display an image 1011 of markers registered in the first viewing screen 1010. The electronic device 301 may display the image 1011 of the registered markers stored in a memory (e.g., the memory 330 of FIG. 3).

According to an embodiment, the electronic device 301 may determine whether there is an image corresponding to the registered marker in the image obtained using the camera 380. For example, the electronic device 301 may identify a marker based on image similarity and/or the location information of the electronic device 301.

Referring to reference numeral 1002, the electronic device 301 may perform identification of a marker 1012 on the image obtained by the camera 380. While performing the marker identification, the electronic device 301 may display a visual effect indicating that the marker identification is being performed, on the marker 1012.

Referring to reference numeral 1003, the electronic device 301 may display an object corresponding to a marker on the identified marker 1012. For example, the electronic device 301 may overlay an object corresponding to a marker on an image (e.g., a preview) obtained by the camera 380 to display the overlain result on the display 360.

Figure 11:
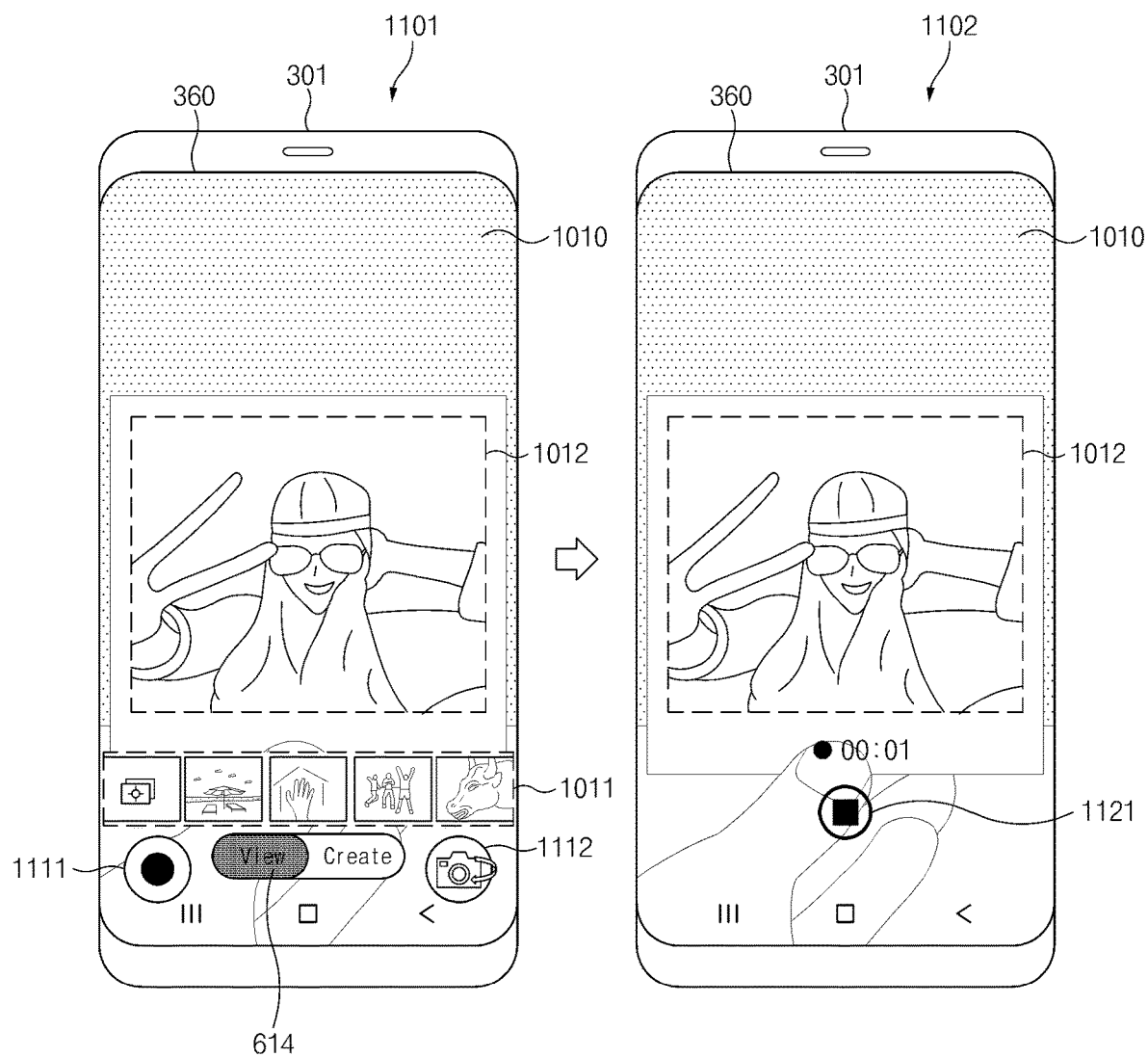
FIG. 11 is a diagram illustrating an example augmented reality contents recording interface, according to various embodiments.

FIG. 11 is a diagram illustrating an example augmented reality contents recording interface, according to various embodiments.

Referring to reference numeral 1101, according to an embodiment, the electronic device 301 may provide an interface for capturing augmented reality contents, on the first viewing screen 1010. For example, the electronic device 301 may display a recording button 1111 for capturing the augmented reality contents and/or a camera switching button 1112, on the first viewing screen 1010.

Referring to reference numeral 1102, according to an embodiment, when an input to the recording button 1111 is received, the electronic device 301 may record the augmented reality contents. In this case, the electronic device 301 may overlay and record an augmented reality object on the marker area 1012 of the real-time image obtained from the camera 380. Accordingly, the augmented reality contents recorded by the electronic device 301 may include the augmented reality object obtained by overlaying the marker area 1012 and the reality image obtained by the camera 380. The electronic device 301 may stop the recording of the augmented reality contents, based on an input to a recording stop 1121.

According to an embodiment, when an input to the camera switching button 1112 is received, the electronic device 301 may change the camera for obtaining an image. For example, the electronic device 301 may change the camera for obtaining an image from a front camera to a rear camera of the electronic device 301, based on the input to the camera switching button 1112. For another example, the electronic device 301 may change the camera for obtaining an image from the rear camera to the front rear camera of the electronic device 301, based on the input to the camera switching button 1112.

In the example of FIG. 11, the electronic device 301 may record the augmented reality contents that the user is experiencing, as it is. The user may easily share his/her augmented reality experience with another user by sharing a shot image or recording video of the obtained augmented reality contents with the other user.

Figure 12:
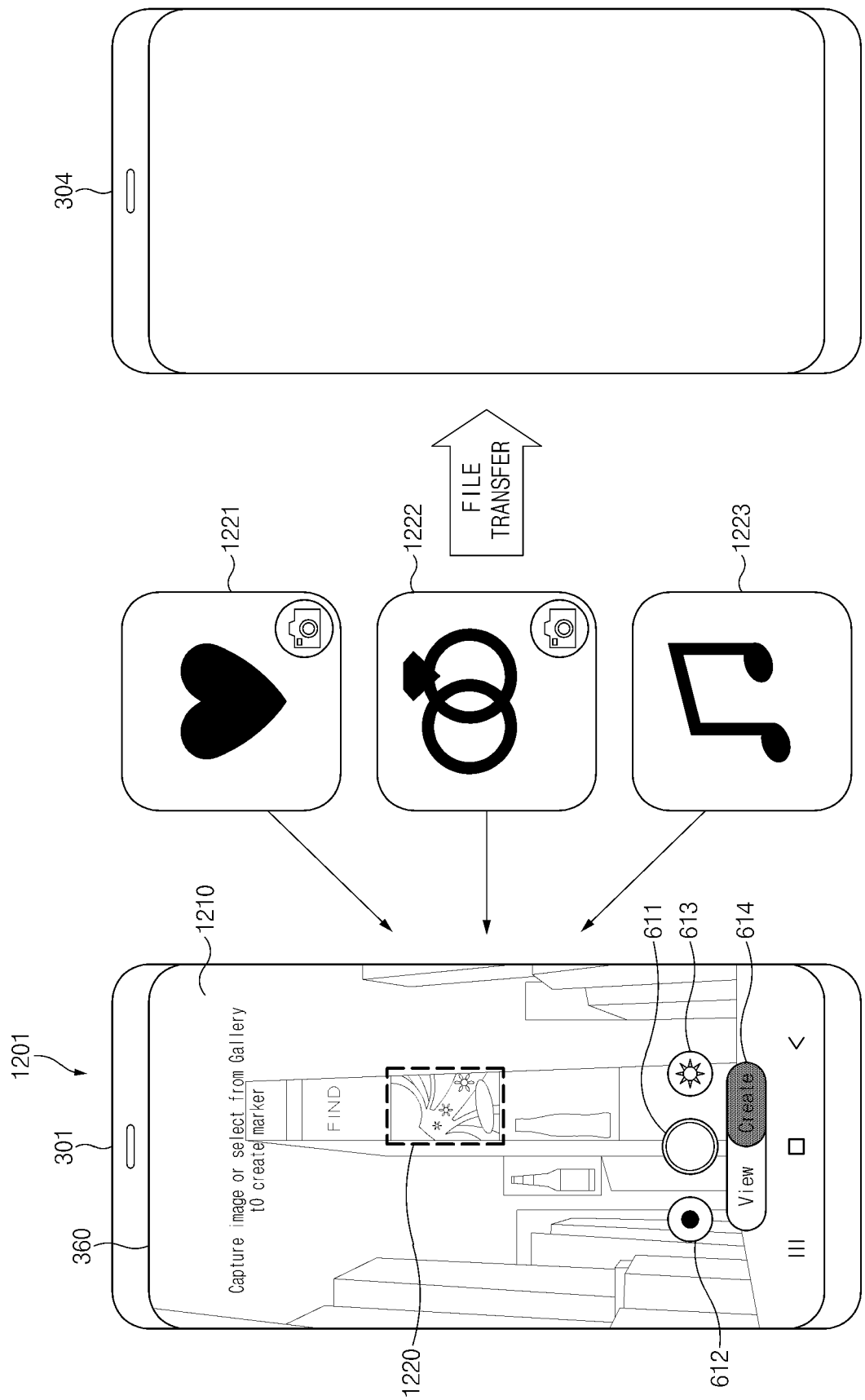
FIG. 12 is a diagram illustrating an example of creating and sharing augmented reality contents, according to various embodiments.

FIG. 12 is a diagram illustrating an example of creating and sharing augmented reality contents, according to various embodiments.

Referring to reference numeral 1201 of FIG. 12, the electronic device 301 may generate a marker using an image and location information. In the example of FIG. 12, the electronic device 301 may set the billboard of a building displayed on the execution screen 1210 to a marker 1220. For example, the electronic device 301 may generate augmented reality contents by mapping the first object 1221, the second object 1222, and the third object 1223 to the marker 1220.

In the example of FIG. 12, according to an embodiment, the electronic device 301 may include information about the location of the electronic device 301 upon obtaining the marker 1220, in the mapping information as well as the correspondence relationship of the objects 1221, 1222, and 1223 associated with the marker 1220. For example, the electronic device 301 may include location information (e.g., information about the latitude, longitude, height, and/or orientation of the electronic device 301) of the electronic device 301 upon obtaining the marker 1220, in the mapping information. For another example, the electronic device 301 may include landmark information associated with the location of the electronic device 301 upon obtaining the marker 1220, in the mapping information. When the landmark is identified upon obtaining the marker 1220, the electronic device 301 may prompt the user whether to set the corresponding landmark to a marker. When the user allows the landmark (e.g., a building with the billboard corresponding to the marker 1220) to be set to a marker, the electronic device 301 may include information of the landmark in the mapping information. For example, the electronic device 301 may identify the landmark based at least partly on the location of the electronic device 301 and/or the landmark image. For still another example, the prompt for setting the marker of the landmark may be omitted. In this case, the electronic device 301 may include the information of the automatically identified landmark, in the mapping information.

According to various embodiments, the electronic device 301 may share the generated augmented reality contents with the external electronic device 304. For example, the electronic device 301 may share the augmented reality contents by transmitting an augmented reality contents file (e.g., 'pnk' file) to the external electronic device 304 using a communication circuit (e.g., the communication circuit 390 of FIG. 3). The electronic device 301 may easily share the augmented reality contents by transmitting the augmented reality contents file including a marker, at least one object associated with the marker, and mapping information to the external electronic device 304. For example, the electronic device 301 may transmit the augmented reality contents file to the external electronic device 304, using, for example, and without limitation, a messenger application, Internet communication, or short range communication (e.g., Wi-Fi direct, NFC, neighbor awareness network (NAN), and/or Bluetooth).

Figure 13:
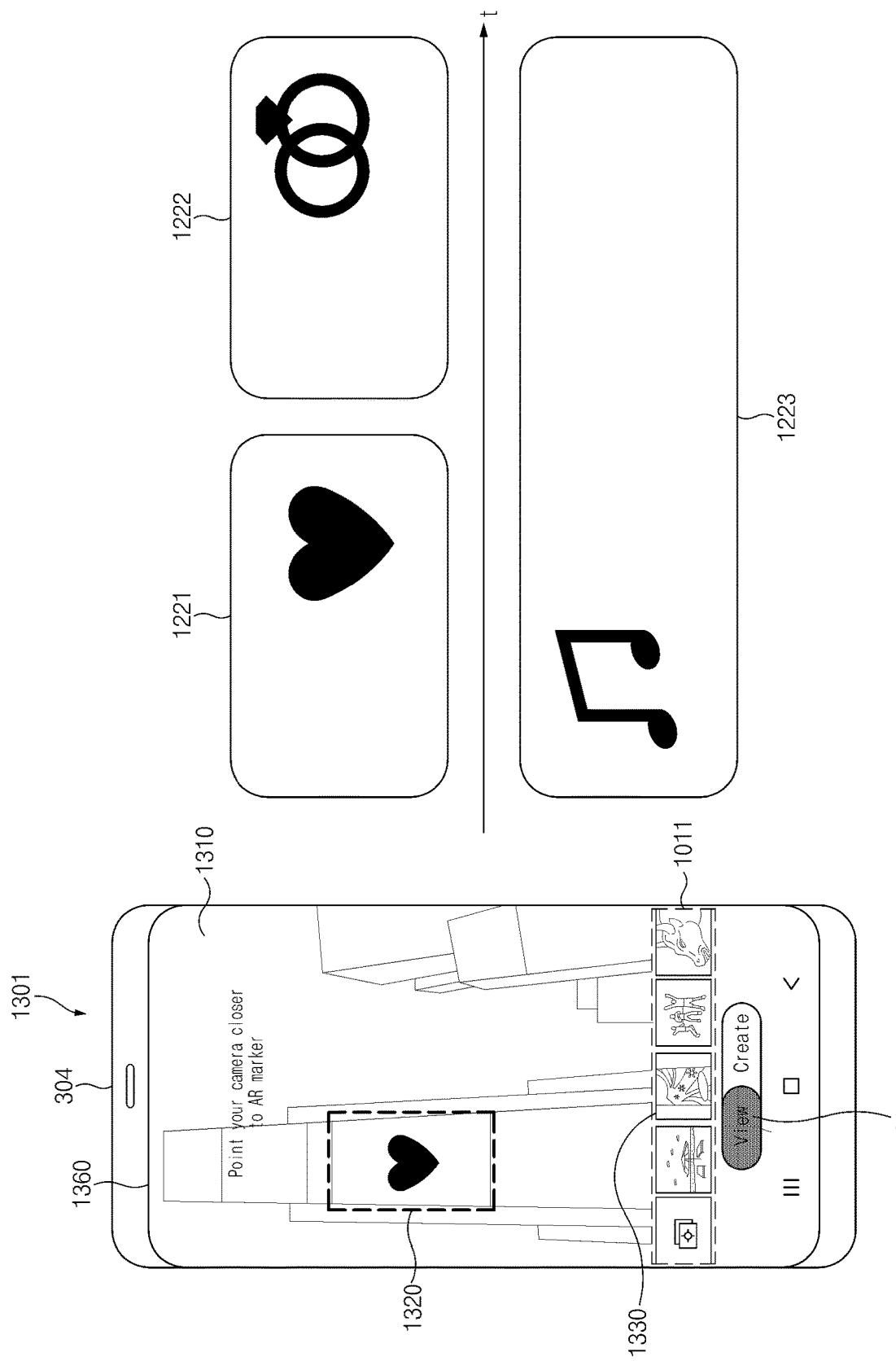
FIG. 13 is a diagram illustrating an example environment for providing augmented reality contents, according to various embodiments.

FIG. 13 is a diagram illustrating an example environment for providing augmented reality contents, according to various embodiments.

In FIG. 13, the external electronic device 304 may receive augmented reality contents from the electronic device 301 of FIG. 12. For example, the external electronic device 304 may identify the billboard of a building as a marker 1320, using an augmented reality contents file received using a camera during the execution of an AR application. For example, the image displayed on the billboard may be changed from a point in time when the electronic device 301 has generated the augmented reality contents. In this case, the external electronic device 304 may identify the marker 1320, using the location information (e.g., location information and/or landmark information of the electronic device 301 at a point in when the marker has been generated) of the received mapping information. Even though the image of the marker 1320 is partially changed, the external the electronic device 301 may identify the marker 1320 using the location information. The external electronic device 304 may identify the marker 1320, using the image obtained through a camera together with the location information. For example, in the example of FIG. 13, the marker image 1330 among the image 1011 of the registered markers may correspond to the identified marker 1320. In this case, even though at least part of the marker image 1330 is different from the marker 1320 of the image currently obtained by the electronic device 301, the electronic device 304 may identify the marker 1320, using the location information of the electronic device 304, an image corresponding to the region of the marker 1320 obtained by the camera, and the marker image 1330.

According to an embodiment, the external electronic device 304 may overlay an object corresponding to the identified marker 1320 to display the overlain result on the display 1360. The external electronic device 304 may display a plurality of objects on the marker 1320 depending on the playback information indicated by the mapping information of the augmented reality contents file. For example, the external electronic device 304 may play the first object 1221 and then may play the second object 1222, depending on the indicated playback order. In this case, the external electronic device 304 may play the first object 1221 by the time (e.g., the first time) indicated by the mapping information and then may play the second object 1222 by the time (e.g., the second time) indicated by the mapping information. Moreover, the external electronic device 304 may play music of the third object 1223 while playing the first object 1221 and the second object 1222.

According to an embodiment, the external electronic device 304 may determine whether to play the augmented reality contents, based on authority information of the mapping information. For example, only when it is recognized, by the authority information, that the external electronic device 304 has the playback authority of the augmented reality contents, the external electronic device 304 may play the augmented reality contents.

In the description of FIGS. 12 and 13, the electronic device 301 and the external electronic device 304 are used to distinguish between a transmitter device and a receiver device. However, the electronic device 301 of the disclosure may perform all of the above-described operations of the external electronic device 304.

Figure 14:
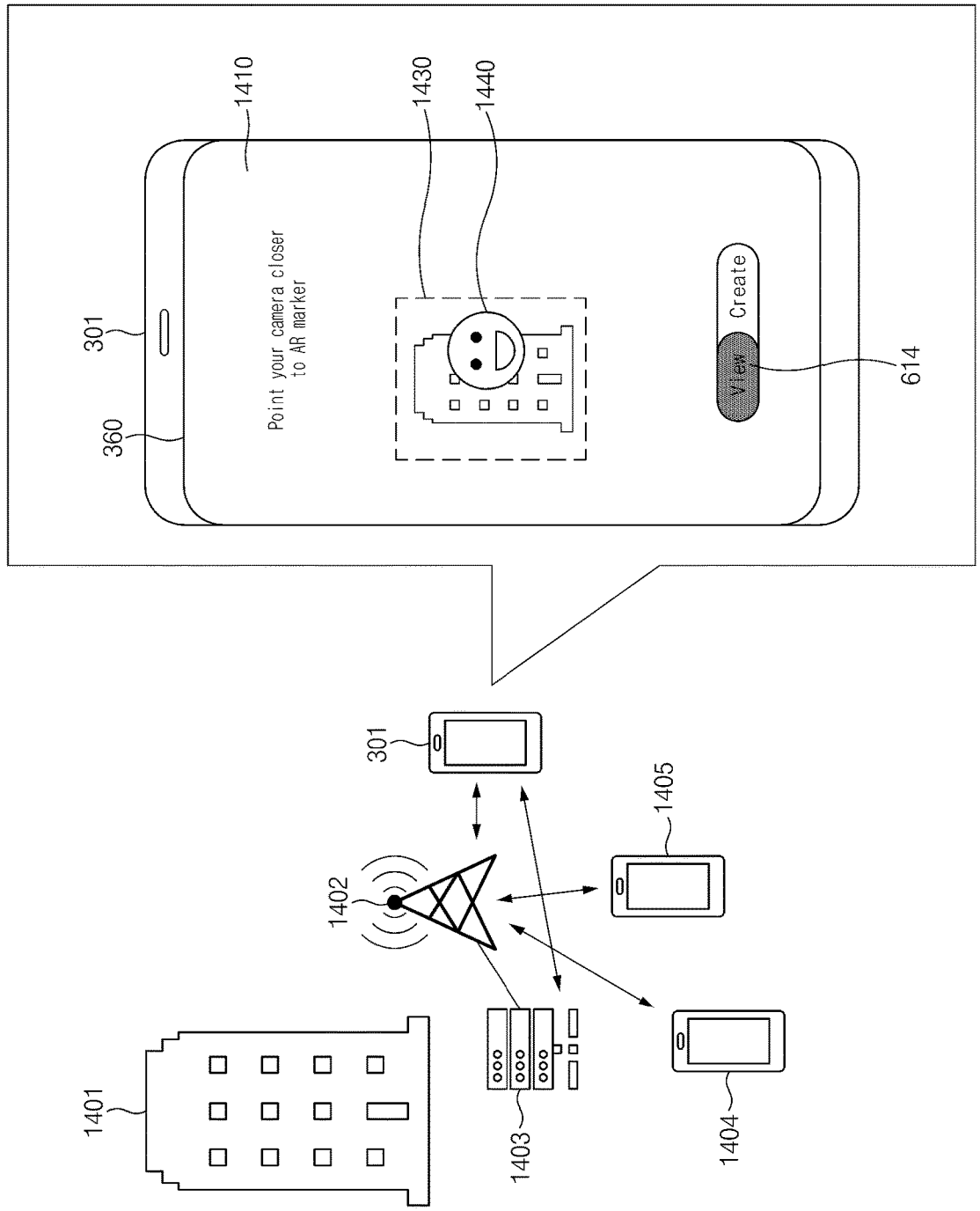
FIG. 14 is a diagram illustrating an example environment for sharing augmented reality contents, according to various embodiments.

FIG. 14 is a diagram illustrating an example environment for sharing augmented reality contents, according to various embodiments.

According to an embodiment, a base station 1402 may transmit augmented reality contents to at least one electronic device associated with the base station 1402. For example, the base station 1402 may transmit the augmented reality contents to electronic devices connected to the base station 1402. For another example, the base station 1402 may transmit the augmented reality contents to electronic devices, in each of which an AR application is installed, from among the electronic devices connected to the base station 1402. For still another example, the base station 1402 may transmit the augmented reality contents in response to a request from the electronic devices connected to the base station 1402.

Referring to FIG. 14, the base station 1402 may share the augmented reality contents with the electronic device 301 connected to the base station 1402, a first external electronic device 1404, and a second external electronic device 1405. For example, the base station 1402 may share the augmented reality contents in which a landmark 1401 adjacent to the base station 1402 is set to a marker. Because the base station 1402 has limited cell coverage, the augmented reality contents may be shared with electronic devices adjacent to the base station 1402. Accordingly, the electronic devices 301, 1404, and 1405 may easily access the landmark 1401, which is a marker, based on geographic proximity.

According to an embodiment, the electronic device 301 may execute the AR application to watch the received augmented reality contents. For example, the electronic device 301 may display an execution screen 1410 according to the execution of the AR application, on the display 360.

In the example of FIG. 14, the electronic device 301 may identify a marker 1430 corresponding to the landmark 1401 from an image obtained by the camera 380 of the electronic device 301. The electronic device 301 may display the augmented reality object 1440 corresponding to the marker 1430 on the marker 1430 of the image obtained by the camera 380. For example, the augmented reality object 1440 may be an image including the message of a celebrity.

According to an embodiment, the augmented reality object 1440 may execute an additional function in response to a user input. For example, when an input to the augmented reality object 1440 is received, the electronic device 301 may access a web page corresponding to the augmented reality object 1440. The web page information may be included in an augmented reality contents file. For another example, when the input to the augmented reality object 1440 is received, the electronic device 301 may receive and play additional contents (e.g., video). The electronic device 301 may receive the additional contents from a server 1403 associated with the base station 1402.

According to an embodiment, the electronic device 301 may receive the augmented reality contents file from a server 1403 associated with the base station 1402. For example, the server 1403 may be a server that supports mobile edge computing (MEC). For example, the base station 1402 may transmit address information for receiving the augmented reality contents file from the server 1403, to the electronic devices connected to the base station 1402. The electronic device 301 may receive the augmented reality contents file from the server 1403, using the received address information. The electronic device 301 may quickly receive the augmented reality contents file from the server 1403, using MEC.

Figure 15:
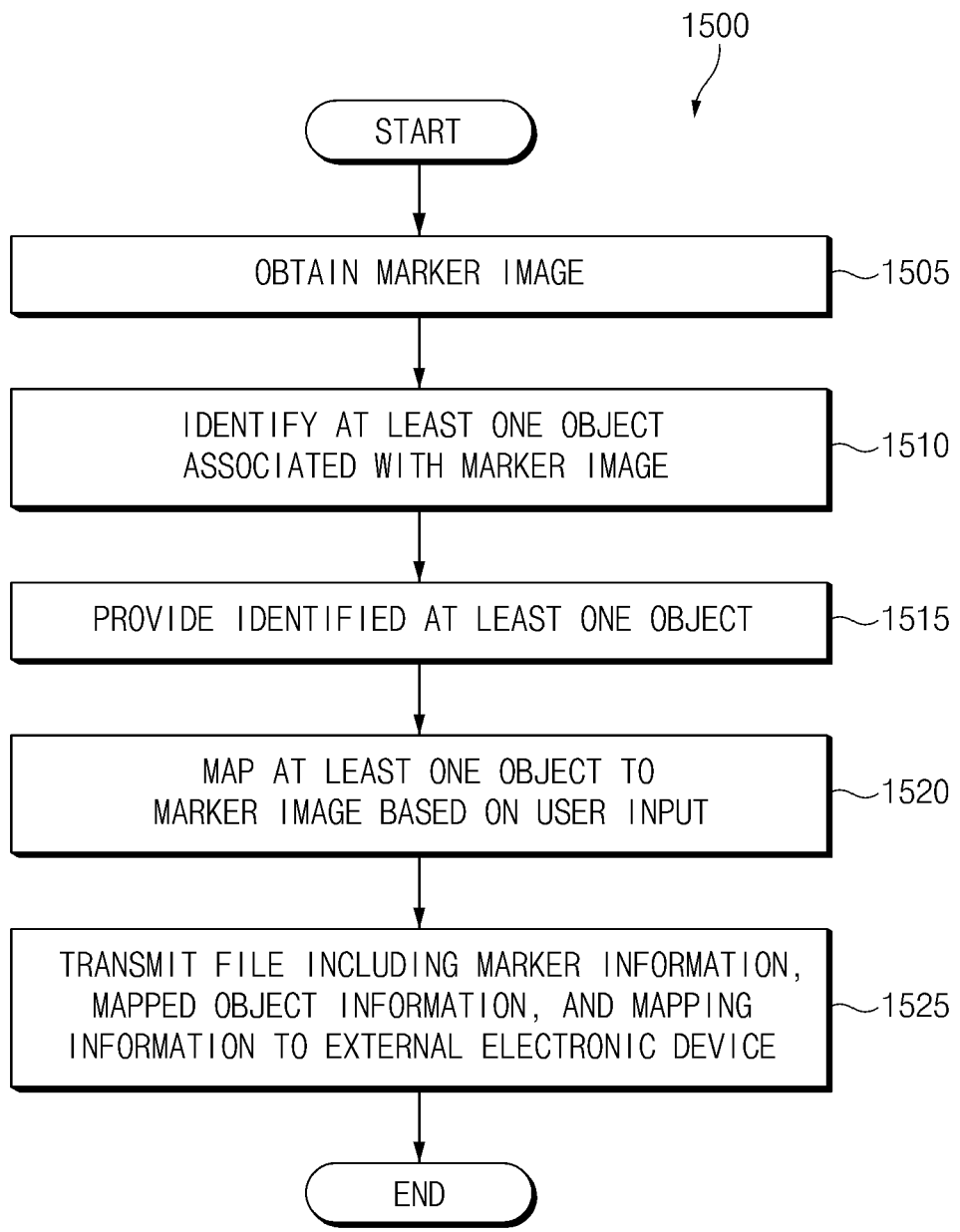
FIG. 15 is a flowchart illustrating an example method of sharing augmented reality contents, according to various embodiments.

FIG. 15 is a flowchart 1500 illustrating an example method of sharing augmented reality contents, according to an embodiment.

According to an embodiment, in operation 1505, a processor (e.g., the processor 320 of FIG. 3) of an electronic device (e.g., the electronic device 301 of FIG. 3) may obtain a marker image. For example, the processor 320 may receive a user input to a display (e.g., the display 360 of FIG. 3) and may obtain a marker image based on the user input.

The processor 320 may display an image obtained from a camera (e.g., the camera 380 of FIG. 3), a memory (e.g., the memory 330 of FIG. 3), or an external server (e.g., the external server 308 of FIG. 3), on the display. For example, the processor 320 may display an image obtained using the camera 380, an image stored in the memory 330, an image corresponding to a specific frame of a video, or an image obtained from an external server 308 using the communication circuit 390, on the display. According to an embodiment, the processor 320 may provide a guide for selecting a marker on an image and may obtain a marker image in the image displayed on the display 360 based on a user input to the guide.

According to an embodiment, in operation 1510, the processor 320 may identify at least one object associated with the selected marker image. For example, the processor 320 may identify at least one object associated with a marker, by searching for the memory 330 or the external server 308 based on the image of the selected marker, the object identified from the image, the keyword extracted from the image, information about the image exchangeable image file format (exif), and/or the image acquisition location.

According to an embodiment, in operation 1515, the processor 320 may provide the identified at least one object.

For example, the processor 320 may display information of the identified at least one object as the related contents, on the display 360. At least one object may include an image, a video, a motion photo (e.g., the combination of an image and a video), music, and/or a media group (e.g., at least one multimedia file grouped into a single story).

According to an embodiment, in operation 1520, the processor 320 may map at least one object to a marker image based on a user input. For example, the processor 320 may map a marker to at least one object (e.g., related contents) based on a user input to select the related contents. For example, the processor 320 may generate mapping information in which a marker is mapped to the related contents and may store the generated mapping information in the memory 330 or the external server 308. According to an embodiment, the processor 320 may store the mapping information together with the marker and the related contents.

According to an embodiment, in operation 1525, the processor 320 may transmit a file including marker information, mapped object information, and mapping information to an external electronic device. For example, the electronic device 301 may transmit the augmented reality contents file to the external electronic device 304, using a messenger application, Internet communication, or short range communication (e.g., Wi-Fi direct, NFC, neighbor awareness network (NAN), and/or Bluetooth).

According to various example embodiments disclosed herein, an electronic device may facilitate the production of augmented reality contents by recommending at least one object based on marker information.

According to various example embodiments disclosed herein, the electronic device may facilitate the sharing of the augmented reality contents by sharing the augmented reality contents through a file.

While the disclosure has been illustrated and described with reference to various example embodiments thereof, it will be understood by those skilled in the art that various changes in form and details may be made therein without departing from the spirit and scope of the disclosure, including the appended claims and their equivalents.

What is claimed is:

1. An electronic device comprising:
   a camera;
   a display;
   a communication circuit;
   a processor operatively connected to the camera, the display, and the communication circuit; and
   a memory operatively connected to the processor, wherein the memory stores one or more instructions that, when executed, cause the processor to control the electronic device to:
   display, on the display, an image obtained by the camera;
   identify a marker in the displayed image based on a first input to the displayed image, wherein the marker corresponds to a portion of the displayed image or an object in the image selected by the first input;
   obtain marker information of the identified marker, wherein obtaining the marker information includes obtaining location of the electronic device and identifying at least one keyword corresponding to an object identified in the selected portion of the displayed image or to the selected object;
   identify a plurality of objects associated with the marker using the location of the electronic device and the at least one keyword;

display the identified plurality of objects on the display as recommendation contents associated with the marker; and map the marker to a plurality of objects selected among the identified plurality of objects based on a second input to generate augmented reality contents.

2. The electronic device of claim 1, wherein information of the marker further includes an acquisition time of the marker, and wherein the one or more instructions, when executed, cause the processor to control the electronic device to:

identify the plurality of objects by searching for objects corresponding to the acquisition time of the marker.

3. The electronic device of claim 2, wherein the one or more instructions, when executed, cause the processor to control the electronic device to:

identify the plurality of objects by searching the memory or an external server using the marker information.

4. The electronic device of claim 1, wherein the identified plurality of objects include at least one of a 2-dimensional (2D) image, a 3-dimensional (3D) image, a video, a still image, or music.

5. The electronic device of claim 1, wherein the one or more instructions, when executed, cause the processor to control the electronic device to:

generate the augmented reality contents by generating a file including the marker, the objects mapped to the marker, and mapping information between the marker and the selected objects.

6. The electronic device of claim 5, wherein the mapping information includes at least one of playback information of the mapped objects, playback authority information, or location information of the marker.

7. The electronic device of claim 5, wherein the one or more instructions, when executed, cause the processor to control the electronic device to:

transmit the generated file using the communication circuit.

8. A method of generating augments reality contents by an electronic device, the method comprising:

displaying, on a display of the electronic device, an image obtained by a camera;

identifying a marker in the displayed image based on a first input to the displayed image, wherein the marker corresponds to a portion of the displayed image or an object in the image selected by the first input;

obtaining marker information of the identified marker, wherein obtaining the marker information includes obtaining location of the electronic device and identifying at least one keyword corresponding to an object identified in the selected portion of the displayed image or to the selected object;

identifying a plurality of objects associated with the marker using the location of the electronic device and the at least one keyword;

displaying the identified plurality of objects on the display as a plurality of recommendation contents associated with the marker; and mapping the marker to a plurality of objects selected among the identified plurality objects based on a second input to generate augmented reality contents.

9. The method of claim 8, wherein information of the marker further includes an acquisition time of the marker, and wherein the identifying of the plurality of objects associated with the marker includes:

identifying the plurality of objects by searching for an object corresponding to the acquisition time of the marker.

10. The method of claim 9, wherein the identifying of the plurality of objects associated with the marker includes:

searching a memory of the electronic device or an external server using the marker information.

11. The method of claim 8, wherein the identified plurality of objects include at least one of a two-dimensional (2D) image, a three-dimensional (3D) image, a video, a still image, or music.

12. The method of claim 8, wherein the generating of the augmented reality contents includes:

generating the augmented reality contents by generating a file including the marker, the objects mapped to the marker, and mapping information between the marker and the selected objects.

13. The method of claim 12, wherein the mapping information includes at least one of playback information of the mapped objects, playback authority information, or location information of the marker.

* * * * *